(12) United States Patent
Jackson et al.

(10) Patent No.: US 6,568,592 B1
(45) Date of Patent: May 27, 2003

(54) DISTRIBUTION OF PARTITIONABLE PHYSICAL PROPERTIES FOR MARKET BASED CONTROL OF ACTUATORS AND SENSORS

(75) Inventors: Warren B. Jackson, San Francisco, CA (US); David K. Biegelsen, Portola Valley, CA (US); Tad H. Hogg, Mountain View, CA (US); Andrew A. Berlin, San Jose, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/406,391

(22) Filed: Sep. 27, 1999

(51) Int. Cl.⁷ .............................................. G06F 17/00
(52) U.S. Cl. ...................................... 235/381; 235/375
(58) Field of Search ................................. 235/375, 379, 235/462.01, 381, 380, 382, 382.5, 384, 383; 705/9, 10, 14, 402, 412, 500

(56) References Cited

U.S. PATENT DOCUMENTS

| | | | | |
|---|---|---|---|---|
| 3,943,340 A | * | 3/1976 | Seitz ........................ 235/61 L |
| 4,111,637 A | * | 9/1978 | Hillman, II ................. 137/113 |
| 4,196,612 A | * | 4/1980 | Clardy et al. ............... 73/23.1 |
| 4,247,899 A | * | 1/1981 | Schiller et al. .............. 222/26 |
| 4,345,146 A | * | 8/1982 | Story et al. ................. 235/381 |
| 4,354,620 A | * | 10/1982 | Tsuneda et al. .............. 222/14 |
| 4,469,149 A | * | 9/1984 | Walkey et al. .............. 141/94 |
| 4,827,395 A | * | 5/1989 | Anders et al. ............... 364/138 |
| RE33,600 E | * | 6/1991 | Timmons ................... 236/49.3 |
| 5,327,066 A | * | 7/1994 | Smith ........................ 320/20 |
| 5,708,424 A | * | 1/1998 | Orlando et al. ............. 340/618 |
| 5,877,430 A | * | 3/1999 | Peace et al. ............... 73/861.82 |
| 6,055,521 A | * | 4/2000 | Ramsey et al. ............. 705/413 |
| 6,255,805 B1 | * | 7/2001 | Papalia et al. .............. 323/207 |
| 6,332,128 B1 | * | 12/2001 | Nicholson ................... 705/14 |
| 6,360,137 B1 | * | 3/2002 | Royal et al. ............... 700/231 |
| 2001/0039512 A1 | * | 11/2001 | Nicholson ................... 705/14 |

FOREIGN PATENT DOCUMENTS

DE        003422617 A1  *  12/1985

* cited by examiner

Primary Examiner—Thien M. Le

(57) ABSTRACT

Distributed market based analog control of a system of actuators and sensors. The system is comprised of one or more producing units having an output responsive to a market price and one or more input units having an input responsive to a market price. Market price information is communicated through an information channel that is encoded as measurable changes in non-electrical partitionable physical properties. Such partitionable physical properties include pressure, thermal, chemical or acoustic properties.

15 Claims, 18 Drawing Sheets

FIG. 9
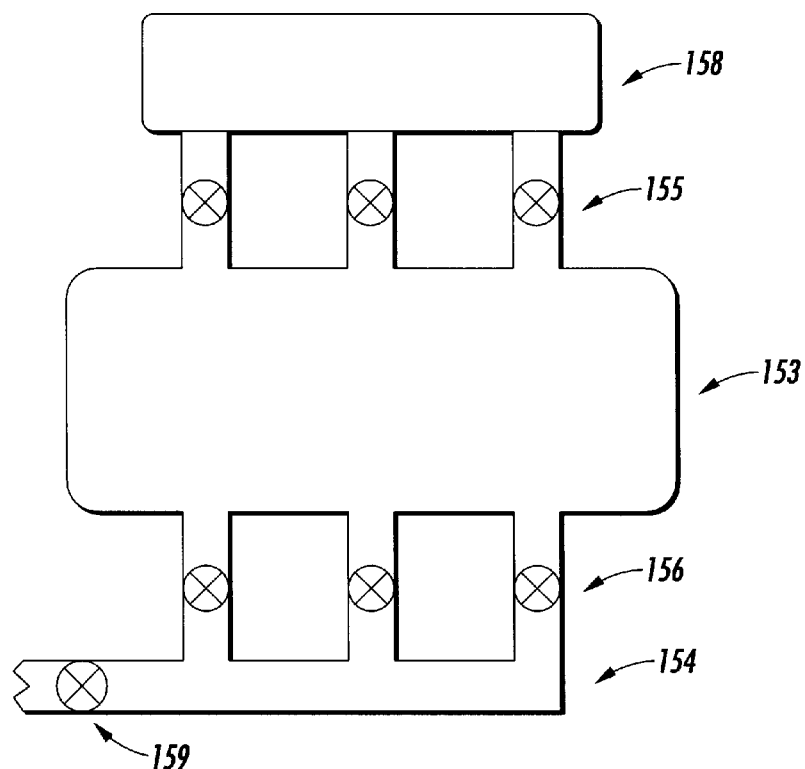
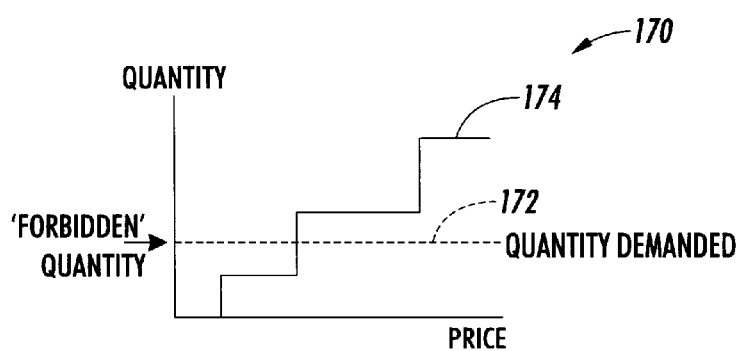
FIG. 10

FIG. 11
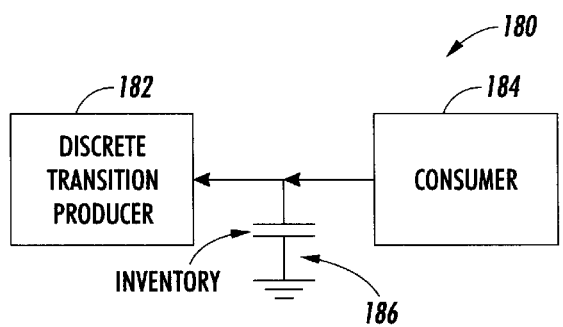
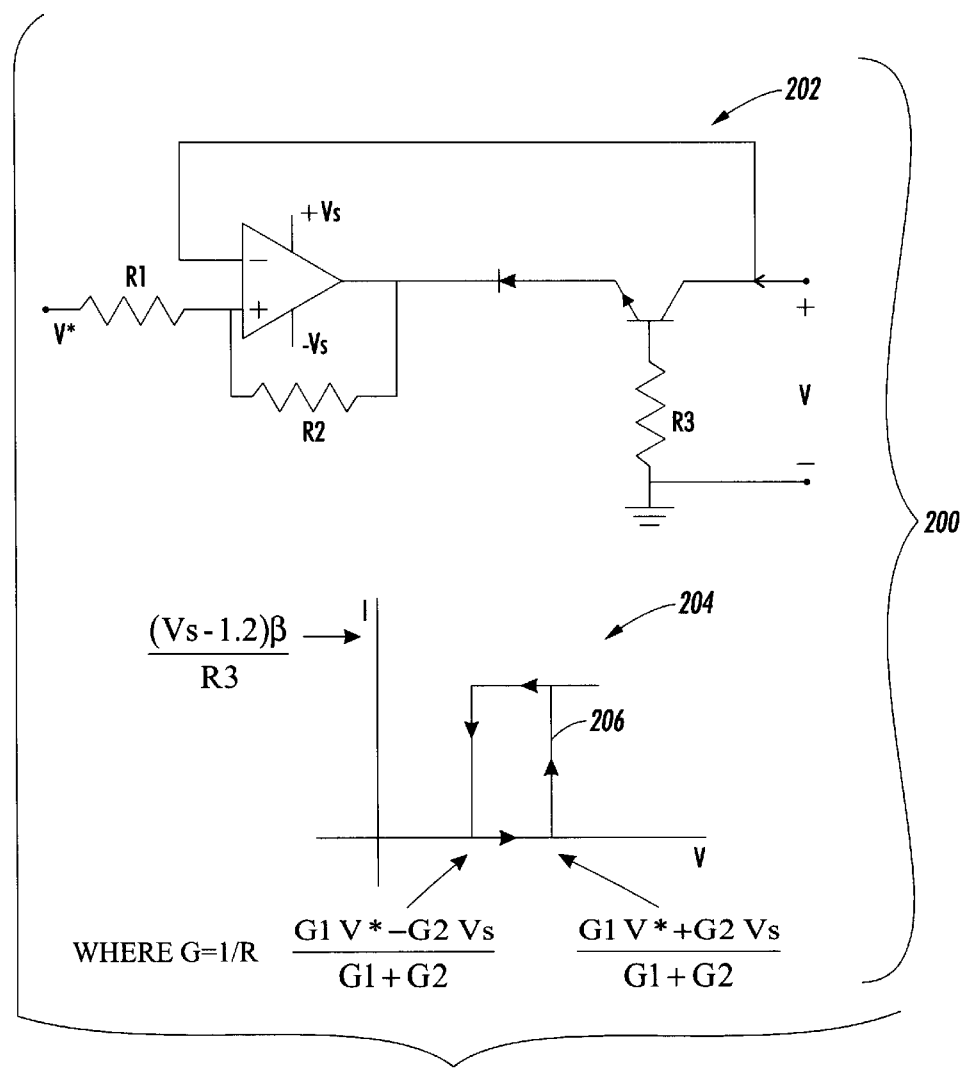
FIG. 12

DISTRIBUTION OF PARTITIONABLE PHYSICAL PROPERTIES FOR MARKET BASED CONTROL OF ACTUATORS AND SENSORS

FIELD OF THE INVENTION

The present invention relates to use of control circuits using various partitionable physical properties to convey information. More particularly, the present invention relates to selective distribution and partitioning of pressure, thermal, chemical, acoustic, or other physical properties as part of a market allocation system for control and coordination of large numbers of actuators and sensors.

BACKGROUND OF THE INVENTION

Market based control requires allocating a task (e.g. physical actuation) among a large number of producers, with each producer bidding for part of the task. The task is determined by consumer agents in the system (higher level controllers or external requirements). Each producer has a supply curve reflecting the actuation or control produced as a function of price and each consumer has a demand curve indicating the actuation needed as a function of price. The equilibrium price is determined by the price at which aggregate demand and aggregate supply are equal. The price in turn determines what each individual actuator produces and individual consumer uses such that the total actuation equals the demanded actuation. As the task changes, different combinations of producers combine to collectively accomplish the task. Such a market is robust against failure of individual agents and changes in tasks, while requiring communication of only one quantity, namely the price, in order to coordinate the actions of an arbitrary and even time varying number of producers. Advantageously, such a price based market system naturally provides a Pareto optimal solution that is near optimal allocation within a degenerate array, even though is the full optimization problem NP-complete. Furthermore, reconciling conflicting goals is readily accomplished by having each individual actuator or consumer individually weight the conflicting goals. The market produces a group resolution between conflicting goals.

Unfortunately, presently available implementation schemes for market based control are impractical and scale poorly for large numbers of producers or consumers, especially when systems requiring real time actuation are considered. One could imagine, for example, connecting the producers and consumers using a bus (e.g. CAN bus, SPI, I$^2$C or Ethernet bus) to communicate pricing information. For example, a 10 Mbit Ethernet system could be used to control $10^3$ nodes of producers and consumers. Even using readily available off-the-shelf hardware, such a market control system is quite expensive, with per connection node costs of about $10 US dollars, for a total cost on the order of $10,000 US dollars. Moreover, due to the long packet header required, the bus would take on the order of 1–10 $\mu$sec to transmit a 10 bit number to each node, and then the same time to transmit the results back to each agent for one cycle of the market equilibration loop. If there are such $10^3$ nodes, this would take on the order 2–20 msecs in the best case without packet collisions. Other widely available buses (e.g. CAN or SPI) would take at least an order of magnitude longer. The problem is even worse if multiple markets for competing allocations are required. For example, in object motion control both torques and forces must be allocated even though the requirements for each may conflict. If one had 10 markets to compute the supply and demand curves of competing allocations, either one would require 10 buses or the process would take on the order of seconds. There also is the issue of synchronizing the processors if a synchronous communication scheme is used.

In contrast to conventional digital control schemes, the present invention uses a high speed analog system minimally requiring only a single line (i.e. a "market wire") interconnecting multiple producers and consumers in a given market. Analog electronic versions of markets allocate tasks such as actuation or control in a multi-producer and consumer system using correspondences set up between current and the quantity of a commodity and between the voltage and the price. The market consists of consumers removing current from a wire and producers adding current to the wire. The price is the voltage on the wire that eventually reaches an equilibrium price. This voltage, analogous to the equilibrium price, determines the current and hence the actuation produced by each actuator. As in the case of markets, the performance of the system is robust against failures and changes in actuators ortasks.

In one version of an analog system in accordance with the present invention, each consumer has a demand curve that decreases linearly as the voltage on the market wire increases and each producer, such as an actuator or controller, draws current from the wire that serves as the 'market'. The conductances determine the slopes of the supply and demand curves as well as the market voltage. If some producers produce less, for example, actuation, less current is removed from the wire, the voltage rises causing more actuation from the remaining producers and reduces the demand by the consumers. Conversely, a decrease in demand (smaller conductances) causes less current to be added to the wire causing the market wire voltage to decrease. Production therefore decreases, and demand by the other consumers increases.

Implementation of the foregoing control schemes is of particular utility for problems requiring a large number of actuators to produce a desired actuation level. In this case there would be one consumer with a flat demand curve, i.e., a current source, for which the current(demand) does not change with voltage (price). The actuators (producer agents) would produce actuation such that all this current is removed to ground (demand balanced by supply). This high bandwidth, asynchronous coordination occurs through one wire and can be inexpensive per connection (only a few chips per node). No explicit computation is required to allocate the resources and a near optimal solution is obtained from a possibly degenerate set of equivalent solutions.

Advantageously, like traditional economic markets, analog circuit implementations of the present invention are robust against changes in actuator function or failures. As the cost per unit functionality of sensors, actuators, and computers (agents) continues to decrease, control systems comprised of many interconnected elements become increasingly practical. High speed systems having $10^3$ processors with 10 market wires connected with multiplexed A/D's and D/A's or multiple op amp packages operating in real time are economically feasible using apparatus and methods of the present invention. Such systems could be much more responsive to events in their environment and internal states as well as exhibit robustness against component failure. Such an analog electronic implementation is distributed, flexible, easily extensible, efficiently uses wires, and reduces the communication load. Analog markets that can compute weighted sums of up to $10^4$ spatially distributed agents and communicate the resulting sum back to agents in about 1–10 μsecs are supportable. The complexity of each such node is about 1–3 op amps per node or one embedded processor chip per node for the more flexible implementations.

In one preferred embodiment of the present invention, a distributed market based analog control system includes multiple producing units, each producing unit having an output responsive to a market price. Production levels are in part determined by needs of multiple consuming units, each consuming unit also having an input responsive to a market price. Communication of pricing information between the producing units and the consuming units is mediated by a marketwire connecting multiple producing units to multiple consuming units. Absolute or relative voltage level, current level, or frequency of voltage or current level changes can all be used to represent price information on the marketwire. For voltage level based pricing schemes, typically voltages of about 5–10 volts are used. Since noise based voltage fluctuations on the marketwire are typically less than about 1.0 mV, as much as 10 bits of precision is available for distinguishing price levels in the system. To simplify construction, reduce cost, and enhance system robustness, substantially identical adjustable circuit elements can be used for both multiple producing units and multiple consuming units, with the substantially identical voltage adjustable circuit elements being connected to the marketwire.

In a particularly preferred embodiment of the present invention, the distributed market based control system has no central controller for setting market prices. In the absence of either a central controller or a central timing mechanism, both of which can be expensive, prone to failure, or introduce substantial delays in price computation and distribution, the reliability of the system is improved. In operation., a producing unit having an output responsive to a market price, a consuming unit having an input responsive to a market price, are connected to a marketwire connecting the producing unit to the consuming unit with changes in analog electrical characteristics of the marketwire representing market price fluctuations. These analog electrical characteristics of the marketwire can be voltage level changes, current level changes, or time or frequency domain changes in electrical properties. Such a system operates asynchronously, without a central timing clock, with the marketwire immediately transmitting changes in price information on a microsecond scale, with no need for polling or n-way exchanges of information between n number of producers and consumers.

Advantageously, the present system for sharing pricing information between producers and consumers is not limited to electrical analog signals. Other analog propagating physical quantities can be used to compute the market and communicate pricing information. For example, a distributed market based analog control system including multiple producing units and multiple consuming units can be based on partitioning or distribution at least in part on non-electrical properties, including systems based singly or in combination on changes in electromechanical, mechanical, pressure, temperature, or thermal properties, chemical concentrations, light levels, or any other suitable physical property that allows for ready addition or subtraction of measurable system properties (e.g. by substitution of easily measurable fluid pressure changes in a closed pipeline system for voltage changes in wire circuits). Other physical characteristics suitable for communication of price include pressure within a cavity, magnetic flux within a superconducting loop, or optical energy within a resonant cavity.

As will be appreciated, since not all producers (consumers) are capable of providing a continuous range of actuation (demand) in response to a continuous range of received prices, some mechanism for handling stepped (or quantized) actuator response functions without introducing unwanted oscillations is needed. More generally, while it may not be possible to balance supply and demand exactly at each instance of time it can be possible to balance the time averaged supply and demand. The present invention provides such a mechanism by employment of an inventory or buffer unit to temporarily store excess output or demand and permit market equilibration. The inventory unit may be attached, along with producing units and consuming units, to a single marketwire or incorporated into individual or groups of producing and/or consuming units. In operation, for example, the inventory unit can inject additional charge, raise voltage level, or adjust vibrational amplitudes to smoothly equilibrate the market of consumers and producers.

Such inventory units are particularly useful in conjunction with on/off actuators such as valves. Most often instantaneous valve actuation cannot exact balance the instantaneous demand. For those embodiments of the invention having multiple valves, each of the multiple valves has a valve controller to control opening and closure of the multiple valves. A marketwire is connected to each valve controller to convey price information by analog fluctuations in electrical characteristics of the marketwire. Valves can be completely open and completely closed in certain embodiments, while valves controllable to partially open or close are possible in other embodiments. Valves can be used to control fluid flow (liquid or air), or even used to control radiant energy (e.g. light valves).

Multiple markets can be used to reconcile conflicting resource allocation, a problem that nearly always occurs in real systems. The present invention provides a smooth robust balance between conflicting goals. A market wire is established for each resource to be allocated. The actuators (producers) and consumers for each resource participate in a market that establishes a price for each resource. The utility curve for each agent (consumer or producer) that participates in more than one market, represents a weighted combination of each resource. The operation of the aggregate response to the various markets produces a robust, continuous, and optimal solution for conflicting resource allocation. The analogy to traditional economic markets such the allocation between apples and oranges, for example, is that each individuals utility curve expressing their preference for apples verses oranges at a given prices, determines not only how many apples and oranges an individual receives, but also how conflicting resource demands for apple and orange production are resolved.

In other embodiments of the invention, a distributed market based control assembly can be used in conjunction with fixed or movable structures. Typically multiple actuators are attached to the structure, with each of the multiple actuators having an actuator controller to control actuator applied force. Sensors are used for measuring structure movement, and a marketwire is connected to each actuator controller to convey price information to the actuator controllers by analog fluctuations in electrical characteristics of the marketwire. Actuators can be used to stabilize a fixed structure against movement, or alternatively can be used to control movement of movable structures from defined first positions to second positions (e.g. moving a robotic arm so its tip moves from point A to point B).

More generally, the present invention encompasses a control method for non-linear coupled systems of producing units having a single consumer output. The method of the invention includes the steps of setting each producing unit to have an output responsive to an analog signal representative of a market price, and connecting each producing unit to a marketwire, with the changes in the analog signal on the marketwire representing changes in the market price and output response of each producing unit.

Additional functions, objects, advantages, and features of the present invention will become apparent from consideration of the following description and drawings of preferred embodiments.

BRIEF DESCRIPTION OF THE DRAWINGS

FIG. 9 schematically illustrates a marketwire system that uses non-electrical communication between consumers and producers to convey price information;

FIG. 10 illustrates a supply/demand (quantity/price) curve having forbidden regions due to quantized control values;

FIG. 11 schematically illustrates use of an inventory circuit to compensate for any mismatch in demand and supply arising in this case from forbidden supply regions due to quantized control values;

FIG. 12 illustrates a marketwire based control circuit and I-V curve having hysteresis to control oscillations;

DETAILED DESCRIPTION OF THE INVENTION

Figure 1:
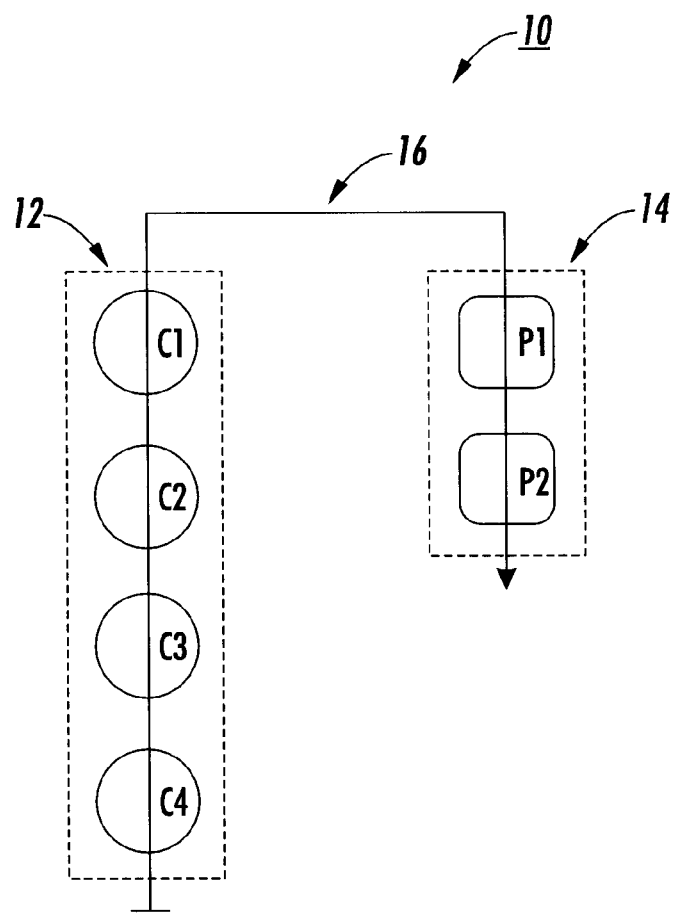
FIG. 1 schematically illustrates a market controlled system having producers and consumers linked by a single marketwire.

As seen in FIG. 1, a distributed market based analog control system 10 includes multiple producing units 14, each producing unit having an output responsive to a market price. Production levels are in part determined by needs of multiple consuming units 12, each consuming unit also having an input responsive to a market price. As will be appreciated, producing units 14 can be any suitable actuator, including actuators for applying forces, for generating radiation, for altering their physical properties (e.g. reflectivity changes in liquid crystal assemblies to alter reflection of incident radiation), or for computational resource production (e.g. low power digital processors that can be selectively brought on and off line as needed). Importantly, for large complex systems, producers and/or consumers may consist of lower or higher level control systems or even other markets. For example, a higher level system may be regarded as a consumer for the output of a lower level system. The market be used to synchronize the actions of many controllers. In preferred embodiments, actuators can be used to open and close valve assemblies, to provide movement forces for robotic machinery, move objects within office machines, or to provide countermovement dampening forces to reduce vibrational movement. Consuming units 12 can include sensor systems for control of the foregoing actuator systems, or can themselves be systems for consuming physical, electrical, or computational resources produced by the producing units 14.

Communication of pricing information between the producing units and the consuming units is mediated by a marketwire or groups of marketwires 16 connecting multiple producing units 14 to multiple consuming units 12. Absolute or relative voltage level, current level, or frequency of voltage or current level changes can all be used to represent price information on the marketwire. In addition, non-electrical signals, such as may be represented by vibrational modes (e.g. acoustic transmission), radio wave links with amplitude and frequency encoding, heat, pressure, or optical links (e.g. pairwise infrared diode or laser links) between producer and consumer units. For voltage level based pricing schemes, typically voltages of about 5 volts are used. Since noise based voltage fluctuations on the marketwire are typically less than about 1.0 mV and can be as low as 10 $\mu$V within typical bandwidths used in this application, 10 bits or more of precision are available for distinguishing price levels in the system.

Figure 2:
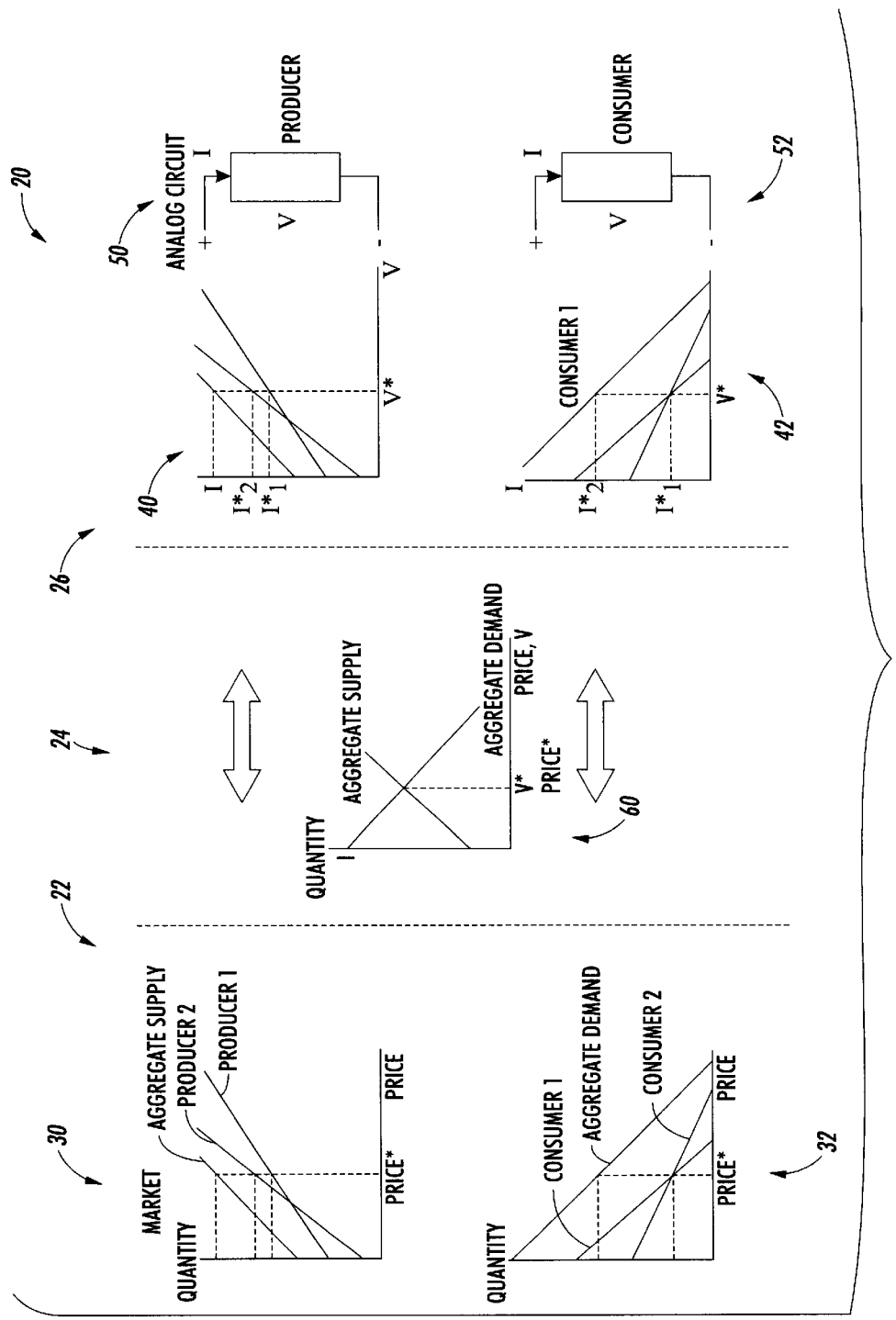
FIG. 2 illustrates a conceptual relationship between idealized economic supply and demand (quantity and price) curves and I-V curves for analog circuits.

To provide better understanding of the theoretical underpinning of the present invention, FIG. 2 is a graphic 20 that illustrates the correspondence between traditional price/quantity (i.e. supply/demand) curves 22 and a corresponding analog circuit system with characteristic I-V curves 26. A merged curve explicitly showing the correspondence is shown as graphic 60 (supply/demand curve 60). In graphic 20, curves 22 respectively illustrate curves for two producers 30 and two consumers 32. An analogous circuit version is illustrated by curves 26, with I-V curves 40, produced by two analog circuits 50, matching curves 30, while I-V curves 42 produced by two sets of analog circuits 52 match curves 32. Respective summations of the individual supply and demand curves produce aggregate supply and demand curves that determine the equilibrium price Price* or voltage V*, The equilibrium price or voltage then determines the quantity or current produced or consumed by each individual producer and consumer in the market (or analogously, in the analog circuit). If producers or consumers leave the market or change their characteristics (e.g. actuating force available), the market (or analog circuit) automatically compensates to ensure that supply and demand (or current/voltage) balance.

Figure 3:
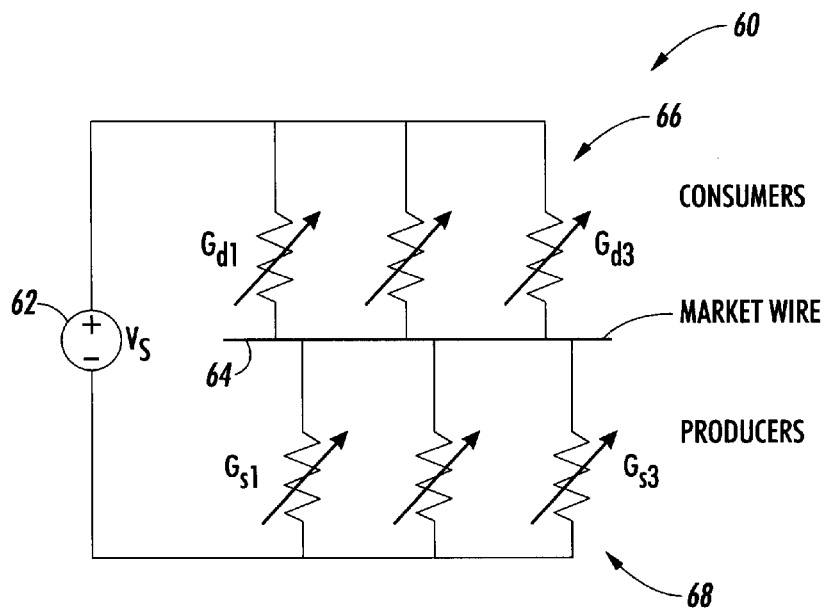
FIG. 3 illustrates a resistive analog circuit having producers and consumers connected by a marketwire.

FIG. 3 illustrates a simple implementation of an analog market circuit 60 having consumers 66, actuating producers 68, connecting marketwire 64, and voltage source 62. Each consumer 66 has a demand curve that decreases linearly as the voltage on the marketwire 64 increases, and each producer 68 draws current from the wire that serves as the equivalent of a market. The conductances determine the slopes of the supply and demand curves as well as the marketwire 64 voltage level. If some producers produce less actuation, less current is removed from the wire, the voltage rises and consequently more actuation is produced by the remaining producers to reduce the demand from the consumers. Conversely, a decrease in demand (smaller conductances) causes less current to be added to the wire, consequently resulting less current added to the wire (decreasing marketwire 64 voltage). Production therefore decreases, and demand by other consumers increases.

Figure 4:
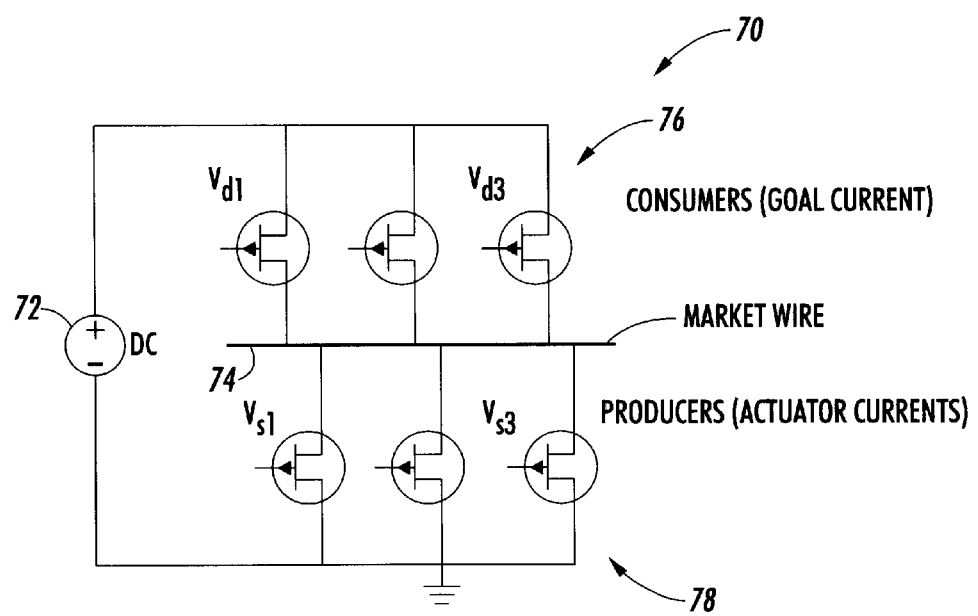
FIG. 4 illustrates a transistor based analog circuit having producers and consumers connected by a marketwire.

While this simple circuit of FIG. 3 is functional, in practice, various circuit elements can be provided to account for differences between actuators or circuit elements. For example, even seemingly identical actuators may provide much more actuation than others, particularly if actuators are discrete or have differing activation (or inactivation) thresholds. Since the lowest threshold actuators would be expected to perform the bulk of the actuation, adjustment of the individual supply and demand curves is important to ensure equitable distribution. For example, this adjustment can be done electronically simply by making each variable conductance a transistor for consumers 76 and producers 78 connected to marketwire 74 (and voltage source 72) as in circuit 70 of FIG. 4. The voltages applied to the transistor gates adjust the supply and demand. The circuit 70 has the desirable feature that it saturates at high currents, thereby naturally limiting the actuation of each actuator which corresponds to the current.

Figure 5:
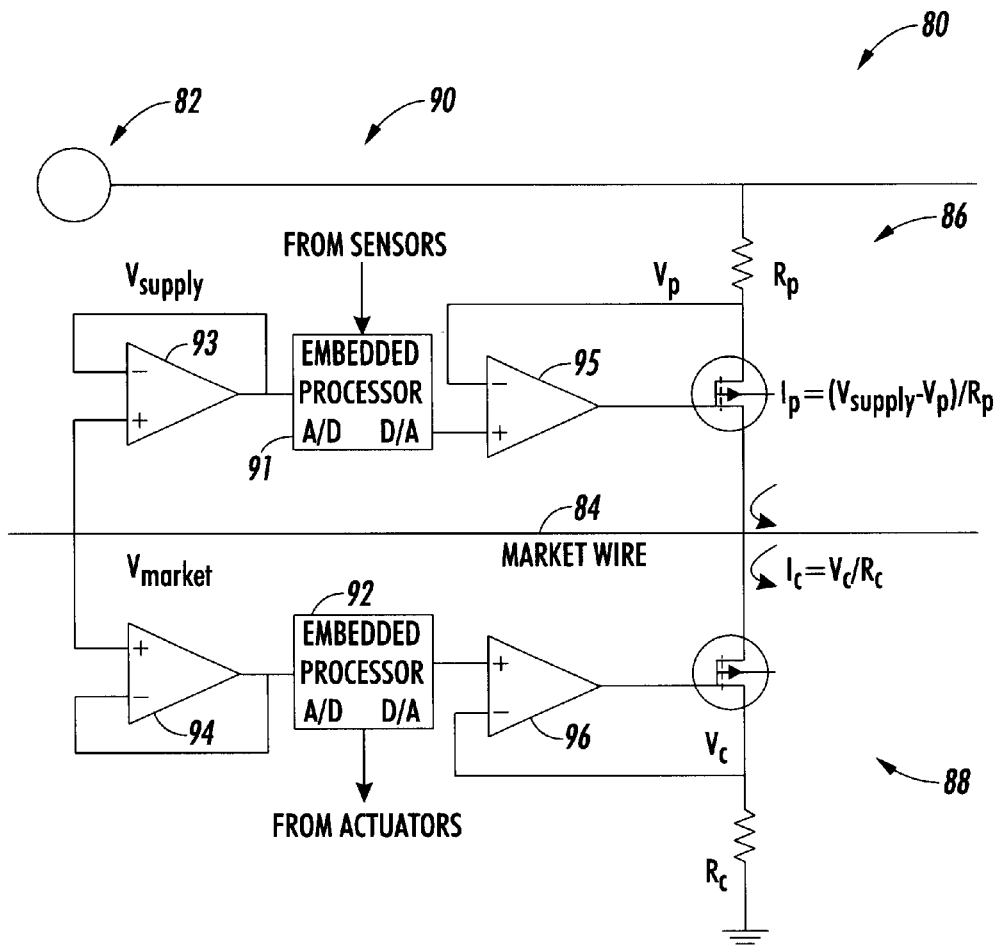
FIG. 5 illustrates a marketwire based control circuit having embedded processors with A/D and D/A converters.

More generally, one can create any arbitrary supply and demand curve using an embedded microprocessors 90 for each consumer 86 and producer 88 connected via marketwire 84 as shown in circuit 80 in FIG. 5. Each processor 91 and 92 can control a number of sensors or actuators and participate in a number of markets (each of which would have an additional marketwire, not shown) simultaneously. Also indicated in block form is the connection between the market, actuation and sensing of the market price. The market price voltage is measured by the A/D and is used to determine the desired actuation or goals. Once this actuation (goal) is determined via the supply (demand) curve, the current is produced by varying the D/A. The op-amps 93, 95, 94 and 96 buffer the market from digital signals in the processors. This partially analog/partially digital implementation is the most general and flexible in that all kinds of market behaviors and temporal variations can be programmed into the processor. This flexibility is obtained at the possible greater cost of a processor and complexity in that each processor must be connected to a bus for programming in the event fixed pre-programming is not sufficient.

Figure 6:
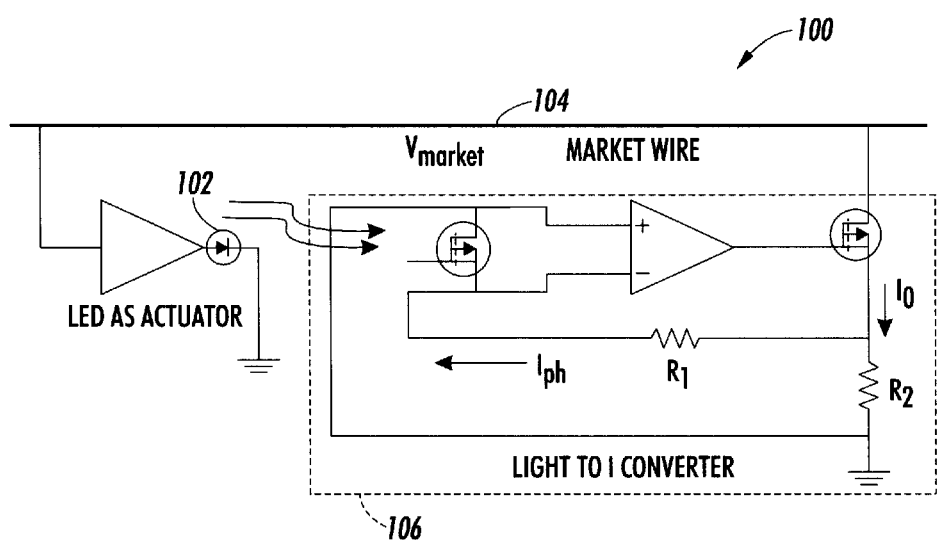
FIG. 6 illustrates an analog circuit producer employing a light emitting diode as an actuator whose intensity is set by marketwire based control (any other actuator may.

Alternatively, an all analog solution for an example case of an LED producer using op amps is presented in FIG. 6. This all analog circuit 100 for a single producer demonstrates both the reading of the market voltage, driving an actuator, and sourcing the appropriate current onto a market wire 104. The actuator (producer) is an LED 102 that produces radiant energy in this example, but could be any other actuator including force based or discrete actuators. The current removed from the wire, $I_0=I_{ph}(R_1/R_2)$, is proportional to the actuation of the LED 102 as measured by the phototransistor circuit 106. Any number of these producers can be connected up with consumers as shown in previous figures to yield a market allocation of light. In this case, the market includes the actuation as part of the closed loop. Hence, if the actuator fails or ages, the results are compensated by feedback with the rest of the market. In this implementation, the speed of the market adjustment limited by the speed of the actuator.

Figure 7:
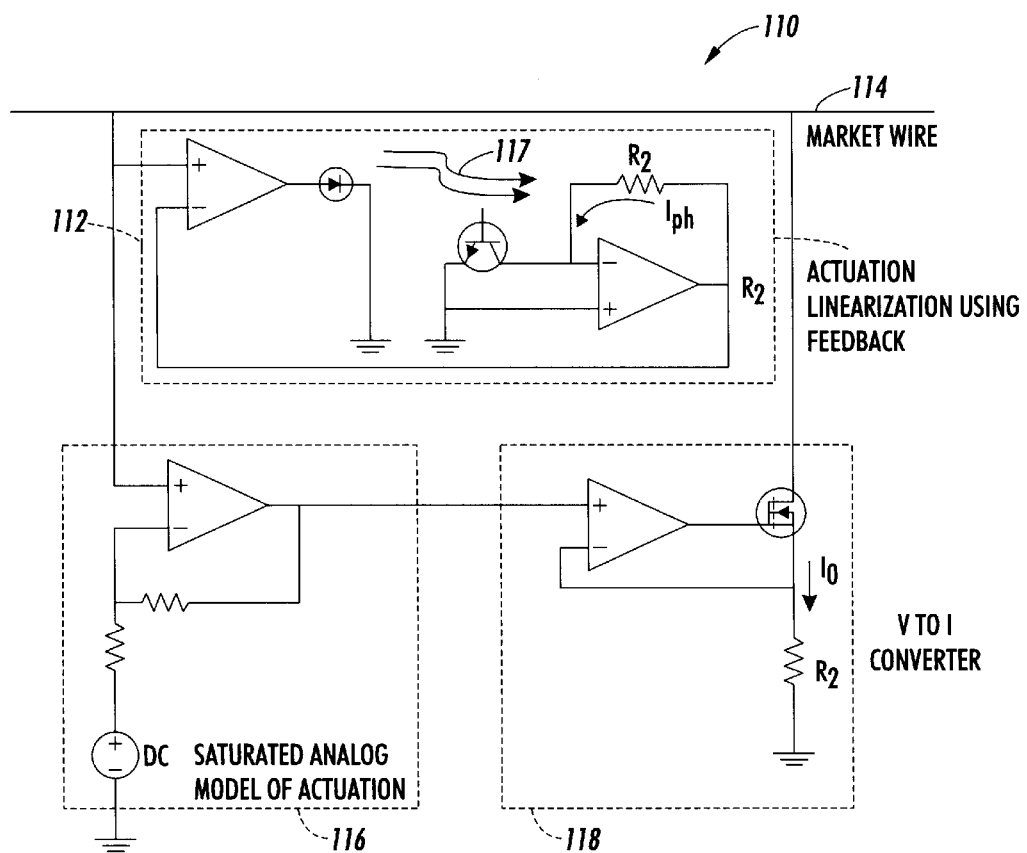
FIG. 7 illustrates an alternative analog circuit for enabling marketwire based control of a light emitting diode as an actuator.

An alternative pure analog circuit 110 implementation where the market speed is not limited by the actuator, shown in FIG. 7. In this implementation an analog model of the actuation 116 is used to determine the response to the voltage on marketwire 114 rather than the actual actuator 117. Because most actuators exhibit complex nonlinear behavior that is usually difficult to model in analog circuits, the actuation is linearized using a feedback circuit 115. connected to a V-to-I converter 118. The linearized behavior is modeled using saturated analog circuit 116 providing input to a linear op-amp circuit 112 that saturates at large voltages as does the feedback linearized version of the actuator 115. The voltage output of the analog model of the linearized actuation 116 is converted to a producer current using the V-to-I converter 118. The analog model of the feedback linearized system 116 is used to compute the market equilibrium on a rapid time scale. The actuator then follows the market voltage on its own time scale to deliver the necessary actuation corresponding to the market voltage. This circuit will compute the market equilibrium faster without excessive actuator switching.

Using the foregoing analog circuits such as illustrated in FIGS. 5 through 7, the aggregate demand and supply of multiple circuits can be rapidly determined. If C is the capacitance of the market wire and $G_{tot}$ is the combined total parallel/series conductance of the consumers and producers, then the time constant is roughly $C/G_{tot}$. For typical lines, $C \approx 1$ pF/cm and $G_{tot} 10^{-5}$ $\Omega^{-1}$ and the time constant is 0.1 nsec/cm of market wire. Thus, changes in the actuation are quickly transmitted down the market wire even for long market wires (<10 m). If op amps or A/D's and D/A's are used, then their response time dominates the market equilibration times. The slew time of op amps is on the order of 1 $\mu$sec and typical A/D conversion times are on the order of 1–10 $\mu$sec. Thus, the market computational speed is on the order of 1–10 $\mu$secs. The numbers of agents participating in the market are determined by the minimum measurable currents and the current dynamic range. If each agent adds or subtracts a current roughly equal to 10 times the input bias current of a reasonable amplifier or 1 nA and the maximum range of currents is on the order of 1 mA, one might expect that up to $10^6$ agents could be connected in an operational market. The ability to determine the market price is more limited. The noise from power supplies, Johnson noise, and RF pickup could be as large as 0.5 mV without special precautions while the dynamic range is on the order of 5V. Including the errors of A/D's, 10 bits is routinely achievable, although up to 16 bits may be achievable at additional cost and complexity. The analog market is asynchronous in that there is no need for coordination among the agents. In fact, asynchrony is desired to allow smoothing of aggregate behaviors. In addition, the agents can be connected and disconnected without the need for knowledge of the network structure. Thus, from these limits about $10^3$–$10^4$ devices could be connected in a functioning market system using the circuits shown.

Figure 8:
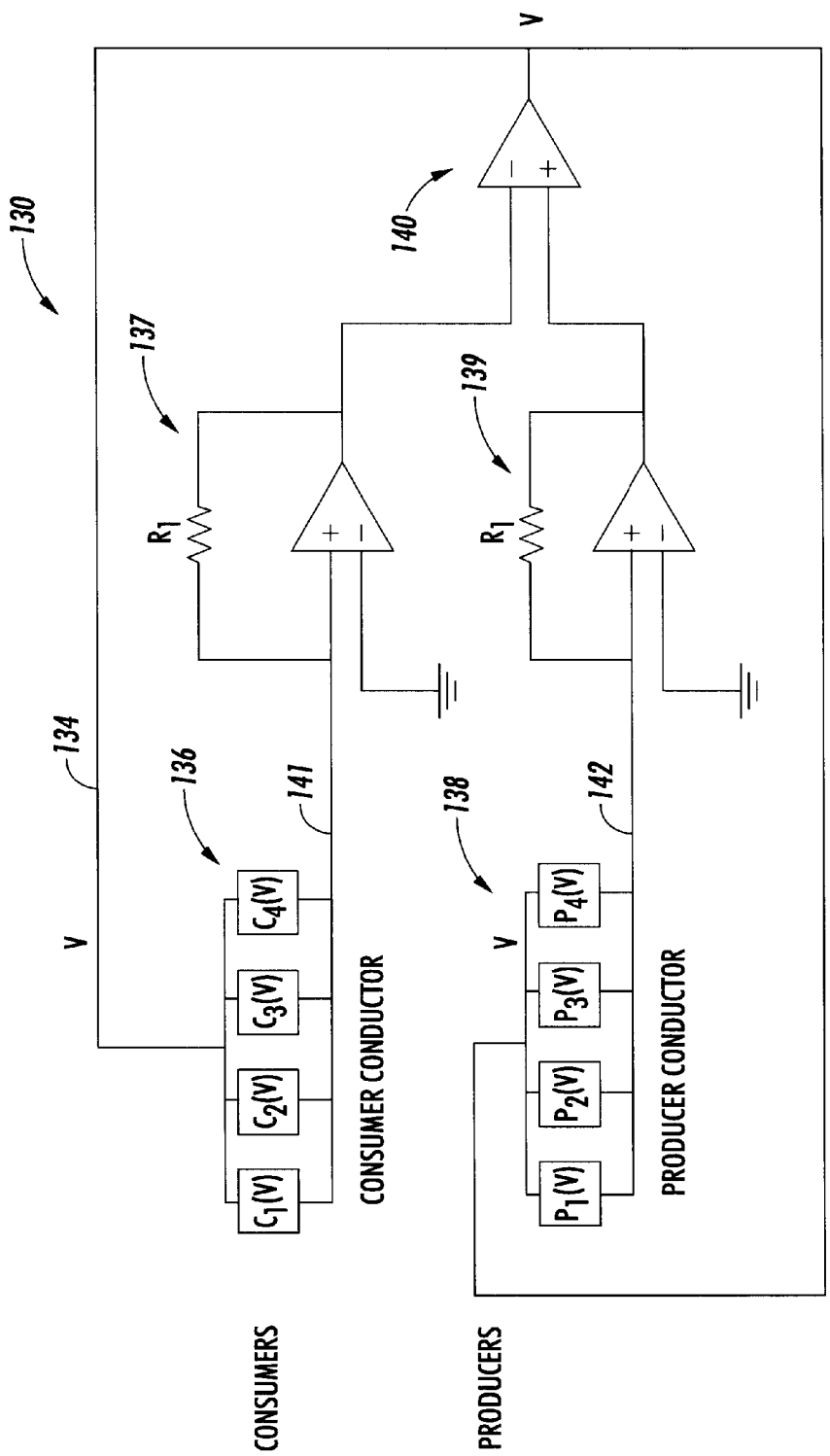
FIG. 8 schematically illustrates marketwire circuit that uses current changes to represent price fluctuations.

In other embodiments of the present invention, the marketwire function of aggregating supply and demand and communicating price can be accomplished by separate wires. For example, FIG. 8 illustrates a circuit 130 modeling a single commodity market with consumers 136 and producers 138 which are aggregated on separate wires 141 and 142 respectively. The difference between aggregate supply and demand is computed using op amps 137, 139 and 140 and converted to a voltage signal impressed on a marketwire 134 that transfers information back to the consumers 136 and producers 138. In operation, consumers add current to a consumer wire attached to a summing amplifier 137. Similarly, producers 138 add current to a producer wire connected to another summing amplifier 139. The respective two current are subtracted in a summing amplifier 140, and output current on the marketwire 134 is representative of commodity price. In this example, the aggregation of supply and demand are computed on separate wires from those that communicate price information. Also, as those skilled in the art will appreciate, in these more centralized market schemes permit implementation of more complex market pricing mechanisms such as auctions.

Figure 21:
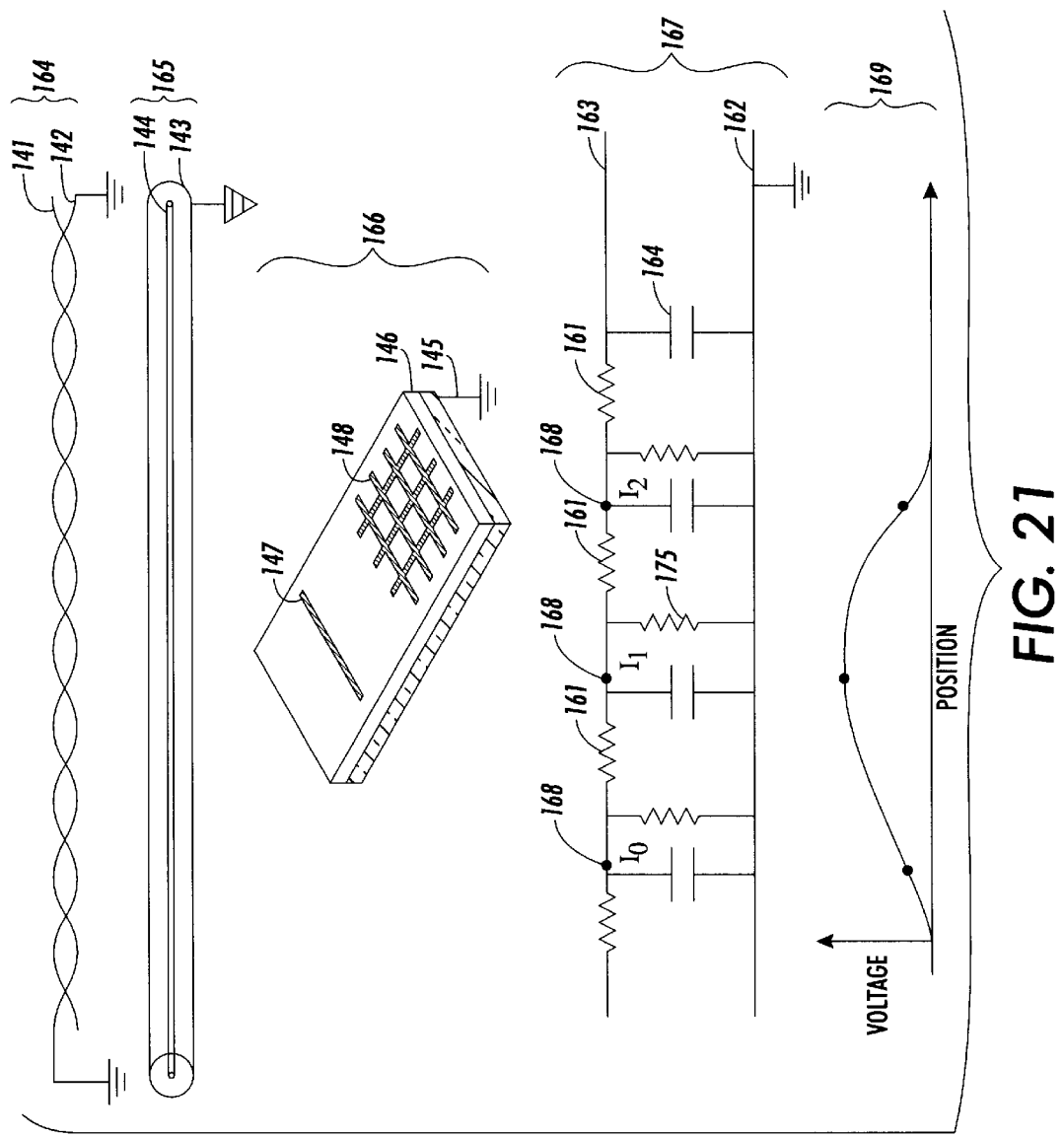
FIG. 21 schematically illustrates embodiments of a market wire including ways of localizing the effects of market supply and demand.

There are various possible embodiments of the analog market wire as shown in FIG. 21. In general each analog market wire consists a electrical conductor to transmit voltage and accumulate charge,. Additional markets would require additional such conductors 141, 144, 147, and 163. In order for the voltage signal to be common and shared among multiple agents, there is an implied additional wire, 142, 143, 145, and 162. The second wire is need to transmit the common ground potential reference for the market voltage. Only one such wire is needed even if there are numerous markets and market wires. These market conductors may be simple wires such as twisted pairs 164, shielded cables 165 or be fabricated as 1$d$ 147 or 2$d$ 148 metal traces on printed circuit board substrate 146 as in printed circuit boards 166. Metal trace or traces 147 or 148 form the market wire while the ground potential is provided by a ground plan. The latter is highly desirable due to the low cost and ability to fabricate many markets connected to the agents. In general, shielding is highly desired in order to isolate the market from extraneous signals that would adversely affect the market voltage. The market wire conductor may also be augmented by capacitors or posses distributed capacitance 164 that help damp out supply and demand fluctuations serving the same purpose as inventories.

An important additional embodiment consists of replacing the market wire by a leaking transmission line 167 with distributed capacitance per unit length 164 and distributed resistance per unit length along the conductor 161, and a leakage conductance from the market wire to ground per unit length 175 as shown in the lumped circuit representation of a transmission line 167. In this embodiment, the currents $I_0$, $I_1$, $I_2$ etc. (168) due to producers and consumers do not cause a uniform voltage (therefore a price) change throughout the whole market. Instead each producer and consumer current changes the price in a localized neighborhood shown in 169. The localization is a function the values of distributed capacitances 164, leakage conductances 175, and resistances 161 as is well known from transmission line formulas. This embodiment of a marketwire can be implemented using discrete resistors and capacitors or using resistance lines. The trace material 147 may be indium tin oxide rather than copper, the material 145 may be any suitable leaky dielectric, and the dimensions of 147 are such to provide the desired capacitance 164. The advantage of the leaky transmission line is that effects of each producer and capacitor are localized. Such a market would guarantee that producers and consumers active in the market are spatially distributed along the marketwire. Moreover, if a producer or consumer malfunctions and attempts to short the market out, the effects would be localized rather than destroying the entire market. One could imagine inductors and other distributed or lumped components could be added to construct a market wire with characteristics beneficial for specific applications.

In still other embodiments of the present invention, a marketwire can carry information using other partitionable physical properties or information transfer media than that based on changes in electrical characteristics. For example, as seen in FIG. 9, a market information system 150 can be based on changes in fluid pressure in various chambers. The system 150 includes a producer valve 155 for passing a pressurized supply fluid from source chamber 158 to the market chamber 153. Similarly, consumers 156 can relieve pressure (by removing fluid via valve 159) from the market chamber 153 to ambient. Changes in pressure of the chamber 153 can be used to transfer market price information between producers and consumers. The pressure resulting from the in-flows and out-flows of the market chamber physically determine the market pressure (price) and communicate the result throughout the chamber with an equilibration time constant given by the ratio of the capacity of the chamber and the conductance of the chamber. This application may be useful in coordinating the actions of a number of pneumatic systems.

In a second example of a non-electrical embodiment of the present invention using the same chamber system of FIG. 9, the market is established using measurable changes in chemical concentration of H ions (namely, the pH of the market chamber 153) to communicate pricing information. In this example the producers 155 admit an acidic solution (low pH solution) from the source chamber 158 into the market chamber 153. The consumers admit a basic solution (high pH) from base supply chamber 154 into the market chamber 153. The measured pH of 153 represents the market price of the system that is controlled by a balance between the producers and consumers. Such a market can find application in distributed reaction systems, biotechnology, incubating vats, etc where it is important to control many sources of chemicals in a coordinated way.

More generally, any intensive thermodynamic quantity such as pressure, temperature, voltage, chemical potential, magnetic field etc may serve as the market price. For example, sensors distributed in the chamber system of FIG. 9 can be used to measure fluid temperature changes, changes in acoustic standing wave intensity, or changes in magnetic field intensity. As will be appreciated, the system illustrated in FIG. 9 is not limited to pipe-like conduit structures, but in certain embodiments can be modified to form solid connecting beams or structures to facilitate thermal, acoustic, or magnetic transmission. Whatever the information transmission channel employed, the connected consumers and producers adjust the respective flow, intensity, chemical species concentration, or generalized current of the conjugate extensive quantity to adjust the price. Examples include temperature-energy (heat) flow, pressure-volume flow, chemical potential-concentration flow, voltage-charge flow (current), etc. The utility function for a producer or consumer determines the current of the extensive property passed by the agent based on the value of the intensive quantity (price). The aggregate effect of the currents passed by producers and consumers changes the value of the intensive quantity until a steady state price emerges.

Whether based on changes in electrical or non-electrical physical properties, certain modifications must be made to analog circuits in accordance with the present invention when supply and demand can not be instantaneously balanced. This often occurs for example when either discrete actuators ((on/off or quantized) are producers or discrete goals are consumers. As can be seen with respect to FIG. 10, a supply curve 170 for a discrete actuator actuation level 174 exhibits discrete jumps as a function of price, making the quantity demanded line 172 impossible produce instantaneously. In this case the circuit will oscillate about the desired amount such that the time average of the quantity supplied will equal the demand. As seen in FIG. 11, the averaging process for systems 180 having discrete transition producers 182 and consumers 184 can be explicitly controlled by using a capacitor 186 to increase the capacitance of the market wire. The capacitor is analogous to an inventory (or warehouse) that smoothes out fluctuations in supply and demand in traditional product markets. While the instantaneous supply and demand are not in balance, the warehouse assures that the time averaged supply and demand remain in balance.

Figure 13:
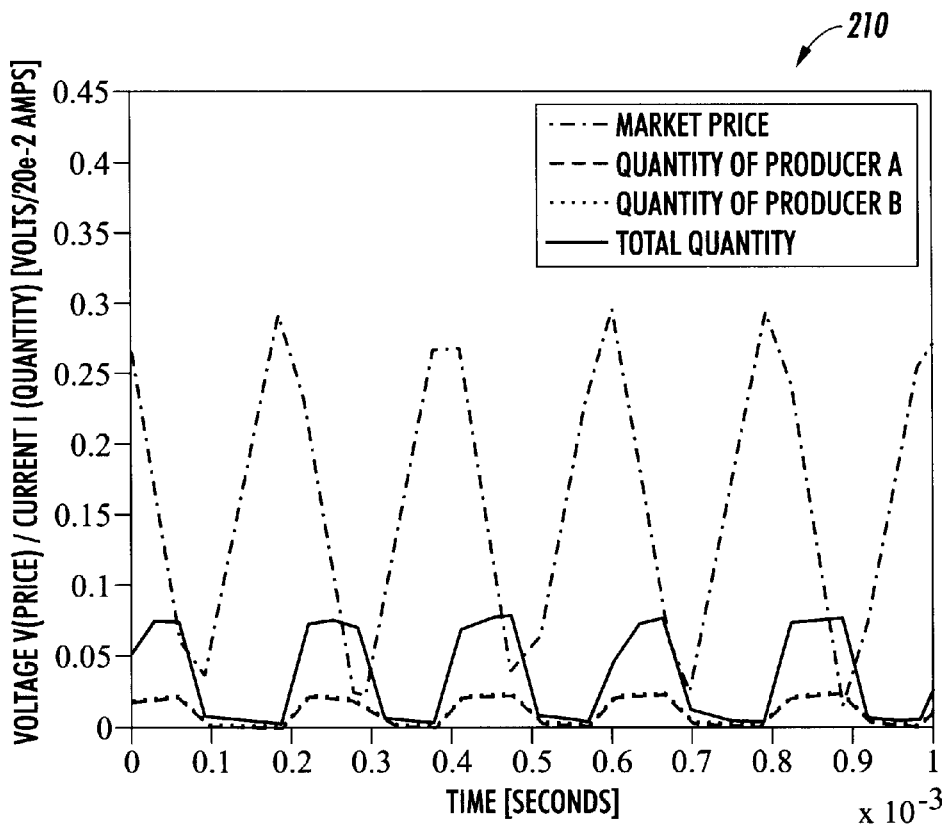
FIG. 13 is a chart illustrating controlled oscillations for three producers, with quantized transition supplies, an inventory, and a fixed demand consumer in a circuit based on that illustrated in FIG. 12.

In addition to an inventory circuit analog circuits operating in conjunction with discrete actuators can be implemented with circuit elements imparting predefined hysteresis such as shown in FIG. 12. As shown in graphic 200, a circuit 202 has hysteretic characteristics (graphic 204). The circuit 200 has an operational amplifier connected in a positive feedback manner to obtain hysteresis, with a transistor connected as a common base to convert the voltage output to current output. The diode restricts current to positive flow only, and also ensures that the transistor in circuit 202 operates in its forward active region. Connecting such a circuit 202 to three producers with discrete actuator transitions and a single consumer demand results in time variation in price and quantity as illustrated in FIG. 13. The total quantity is pulse width modulated to give an average that satisfies demand. Note that price rises when producers are not producing, and fall when producers are producing. In effect, with a circuit 202 and a small number of producer actuators, all the producers turn on for some time, and then turn off for some time, continually oscillating to provide a desired average value.

For certain applications, the foregoing behavior (producers all on/all off) is not desirable since it is sometimes necessary to insure that all actuators or consumers participate in the market so that only a few end up dominating the market (monopolize the market). This more equitable allocation can be implemented using, a circuit 222 shown in Figure to ensure that threshold voltage shifts instantly at each turn-on/turn-off transition, then exponentially decaying back to its original state (see graphic 224, with step 226 and exponential decay graphic 228 illustrated, the transition following formula 227). In operation, for a turn-on transition, the threshold voltage first shifts to the left, making it more difficult for a connected producer to shut off, then gradually decays to the right, increasing the probability of producer turn-off. As would be expected, the opposite occurs for turn-off producer transitions. The hysteretic circuit causes individual actuators to reduce the desire to produce the longer production has continued. In this way, the actuation is shared among the producers; no one actuator does it all.

Figure 14:
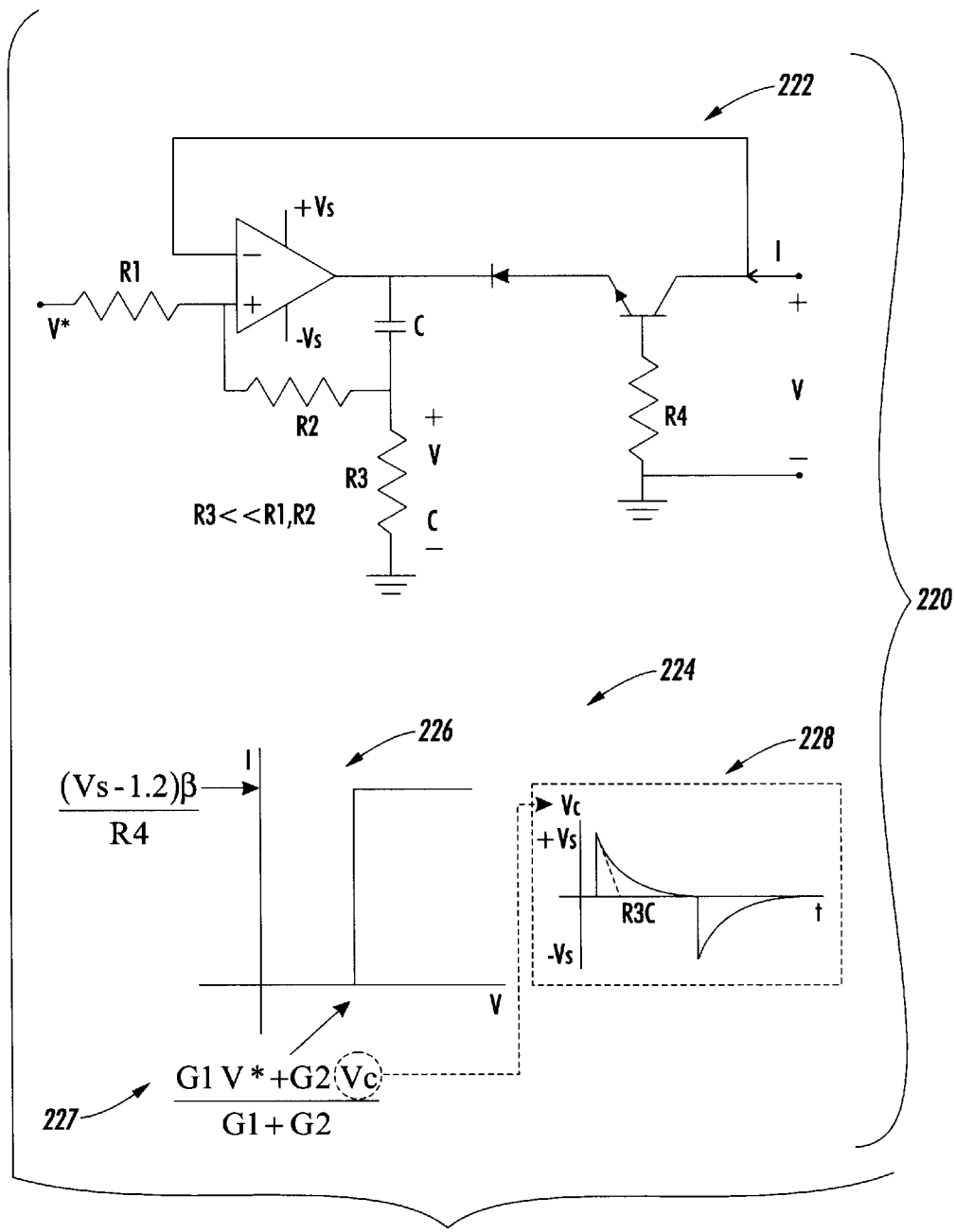
FIG. 14 illustrates a marketwire based control circuit and I-V curve based on that illustrated in FIG. 12, with the circuit modified to allow instant shifts in threshold voltage for improved performance.
Figure 15:
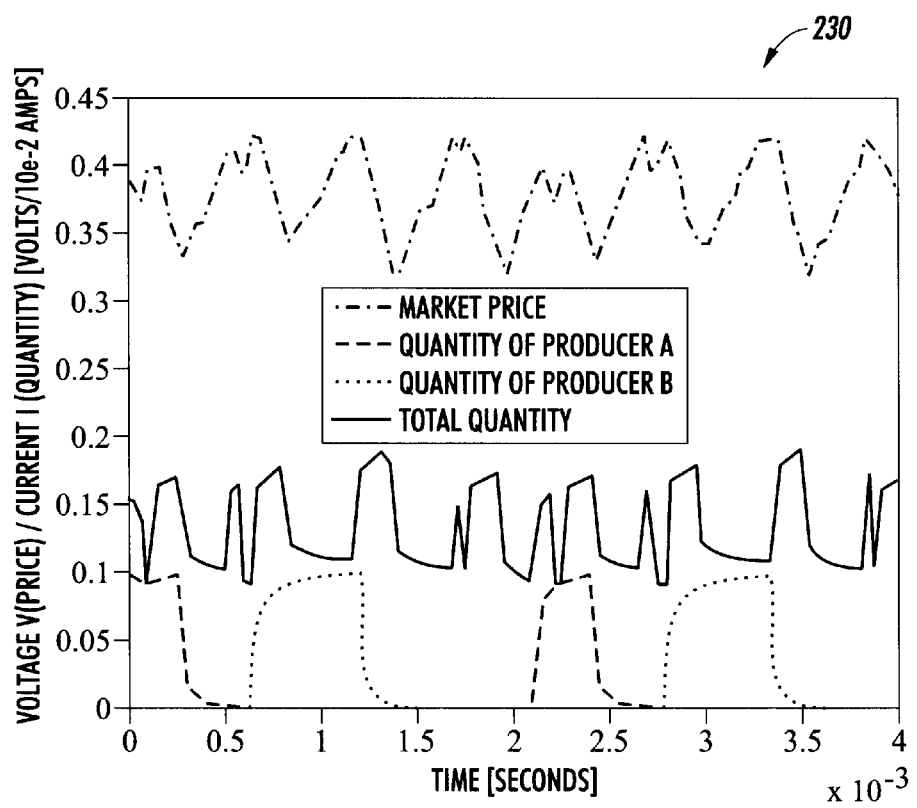
FIG. 15 is a chart illustrating controlled oscillations for eight producers, with quantized transition supplies, an inventory, and a fixed demand consumer in a circuit based on that illustrated in FIG. 14.

The practical utility of the foregoing circuit is seen in FIG. 15, which illustrates a chart 230 showing time variations for a Producer A and a Producer B randomly selected from a pool of eight producers, an inventory unit, and a consumer with fixed demand using control circuits such as discussed in connection with FIG. 14. Note that producers A and B actuation are not in phase, taking turns to produce. This behavior advantageously prevents large amplitude actuator oscillations and more evenly distributes actuator workload.

Figure 16:
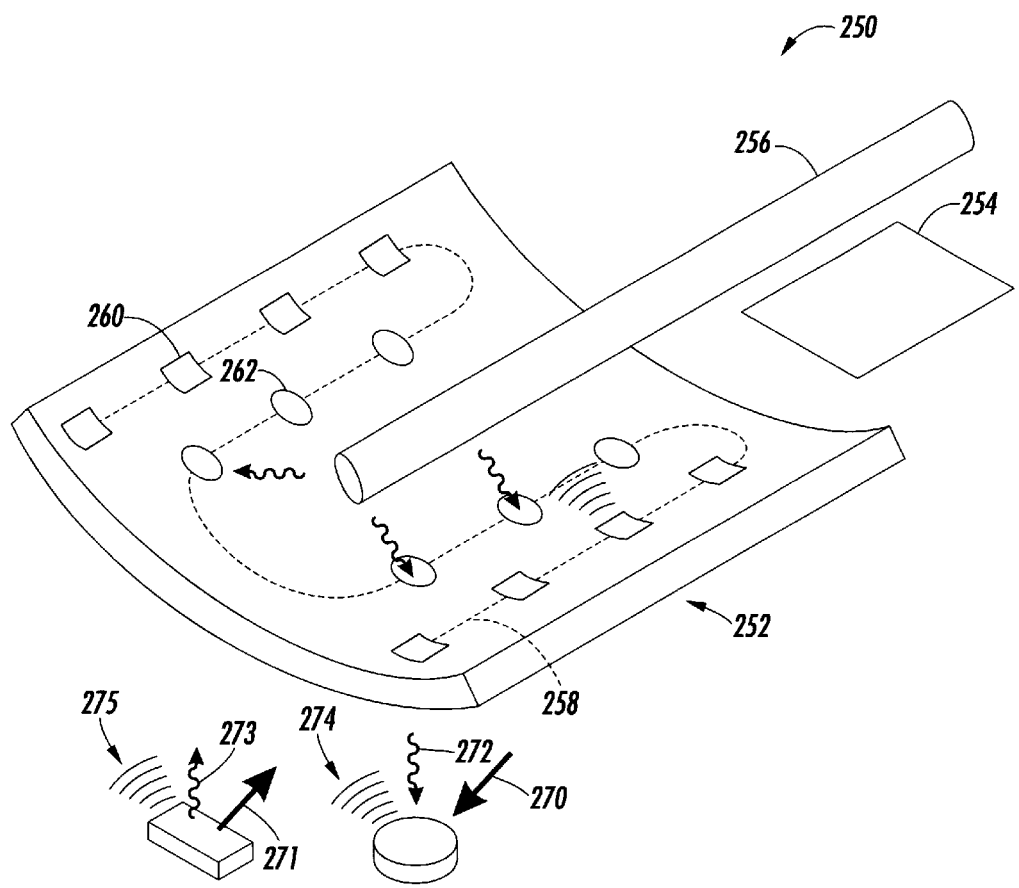
FIG. 16 is an illustrative diagram of a producer/consumer (actuator/sensor) assemblage suitable for applying forces or radiation to external objects.

Analog controllers operating under some type of market communication could find a useful role in many applications, but is most useful for those applications requiring many actuators or controllers, and whose collective behavior is approximately characterized by a weighted summation of the individual responses. The desirable action of a particular agent (producer, actuator) must depend on these weighted averages and location information as opposed to detailed information about the state of other particular valves. While these restrictions appear to limit the utility of the marketwire, actually many problems satisfy these constraints. For example, as seen in FIG. 16 a system 250 in which group of actuators 252 act on objects, such as a collection heaters heating an object 256, light sources illuminating object 256, or air jets from an array of on/off valves moving a paper sheet 254, for example, all satisfy these constraints. As seen in FIG. 16, a marketwire can connect various actuators 260 (that may produce vibrational or acoustical output 275, radiative output 273, or fluid or mechanical forces 271 directed toward objects) to various sensors 270 (that may detect vibrational or acoustical input 274, radiative input 272, or fluid or mechanical forces 270, associated with objects).

Figure 17:
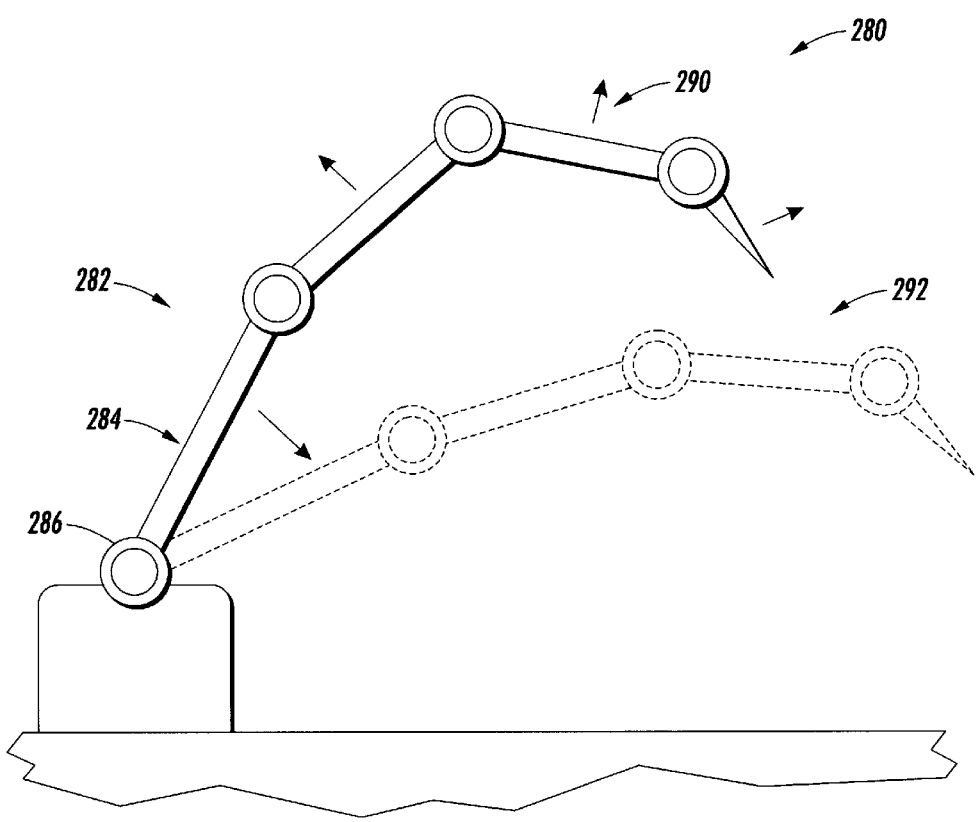
FIG. 17 is a robotic arm movably controlled by a marketwire system with actuating producers and sensor consumers.

In addition to heaters, illuminators, valve assemblies for air jets, or other suitable actuator systems, marketwire controllers can be used to both move and prevent movement of structures. As seen in FIG. 17, an actuator controlled structural assembly 280 can include struts 284 interconnected by rotational hinges 286 to form a robotic arm 282 movable to various positions. Actuators and sensors (actuators of which may be hydraulic assemblies; piezoelectric transducers, or other known motion actuators or combination of actuators) tied together by an analog marketwire and attached to the structural assembly 280 can either cause movement of the struts (generally indicated by large arrows) to a new position (dotted outline 292) or can counter vibrational movement to dampen unwanted motions as needed.

As those skilled in the art will appreciate, any nonlinear-coupled systems with a single output that has a response that is to first order a linear sum of the actuations for sufficiently small actuations can be reliably controlled using apparatus in accordance with the present invention. If the response R of a system is a function of the vector x of actuations given by R=f(x), by a Taylor expansion R≈f($x_0$)+$\Sigma_i w_i \Delta x_i$, where $w_i$ are the weights related to the first derivatives, $x_0$ is the previous actuation state, and $\Delta x_i$ are the small changes in the actuation state. Moreover, significant local non-linearity's can be captured if $w_i=w_i(x_i)$ depends only on the local state. Hence, the applicability of market based systems is quite general, applying, for example to control of buckling beams or arrays of inverted pendulums, as well as the previously discussed valve arrays, robotic arms, or computational resource problems.

To better understand operation of the present invention, one particular analog implementation of a market based algorithm for controlling arrays of discrete actuators is hereafter described. In this implementation, motion of a sheet of paper though the use of a very large number of actuators (open/shut valves for pressurized air jets) must be coordinated to achieve a global goal of precision motion of the sheet of paper (see, e.g. FIG. 16 and paper 254). Dynamically, the paper 254 moves because the air from each air-jet produces a viscous drag force in the plane of the paper that is aligned with the direction of the air-jet. The total force on the paper is very nearly the vector sum of all the forces of the individual air-jets, each of which can produce a constant force in a given direction. The motion is controlled by turning on and off the individual air-jets located under the paper. In operation, the air-jets are constrained not to change state in less time than, say, 3 milliseconds (3 ms). For example, after an air-jet is turned on, it must wait at least 3 ms before turning off. However, once the 3 ms have passed it may turn off at any time. The same is true for the turning on process. There is also the global constraint that the force is discrete because each actuator can produce only one fixed amount of force. Position and orientation of the paper must be known through appropriate sensors at all times, and a main controller can be used to combine this information, with a desired paper path, into a desired force. The main control problems are related to determination of optimal force allocation, that can take on substantially continuous values, as a distribution of large numbers of potentially fallible on and off discrete air-jets.

A typical system of this sort will have a few thousand actuators, with a few hundred actuators lying under the paper at the same time. Typically all air-jets will produce the same amount of force, but will point along different direction in the plane. Assuming a system with motion (of the paper) along one axis and rotation, each actuator (valved air jet) produces not only a vertical supporting force, but also a torque force that is proportional to its perpendicular distance to the center of the paper. For air-jets distributed randomly along the paper, achieving the optimal force and torque requires solving an NP-complete problem, whose difficulty exponentially grows as the number of actuators increases.

The present implementation is based on market principles guiding local distribution of force, with minimal communication between the air-jets and the controller, and minimal communication among the air-jets themselves. The operation of such a decentralized system can easily be continuous in time because the switching time between two actuators need not be a multiple of some fixed time. Because the decentralized system can oscillate at a rate much faster than 3 ms even when the amplitude of oscillations is non-optimal, the root mean square (RMS) error of the integral will be comparable or even smaller than the equivalent error of the centralized controller.

The market principle treats the air-jets as producers and the force and torque controllers as consumers. The producers and consumers communicate through a common voltage (per market) that acts as the price. The price is determined as a function of aggregate supply and demand, which are fed into the market as currents from the actuators and controllers. When demand exceeds supply, the price increases, and either supply increases or the demand decreases, until equilibrium is reached. Thus, it becomes possible to coordinate a large number of sensors and actuators through a single market-wire.

The control of many systems often require reconciliation between a variety of constraints. The analog market system can accomplish this reconciliation through the use of multiple markets. For example, the air-jet system requires at least two markets. Because each actuator provides a different ratio of force to torque, the prices of torque and force must be kept separate. However, the allocation is done in a local fashion, with only the two prices (and their corresponding aggregate current feedback) determining the utility function of each actuator thereby determining behavior of the system. In fact, there exists no entity (e.g. a central actuator controller) that is aware of the positions and orientations of the actuators.

Figure 18:
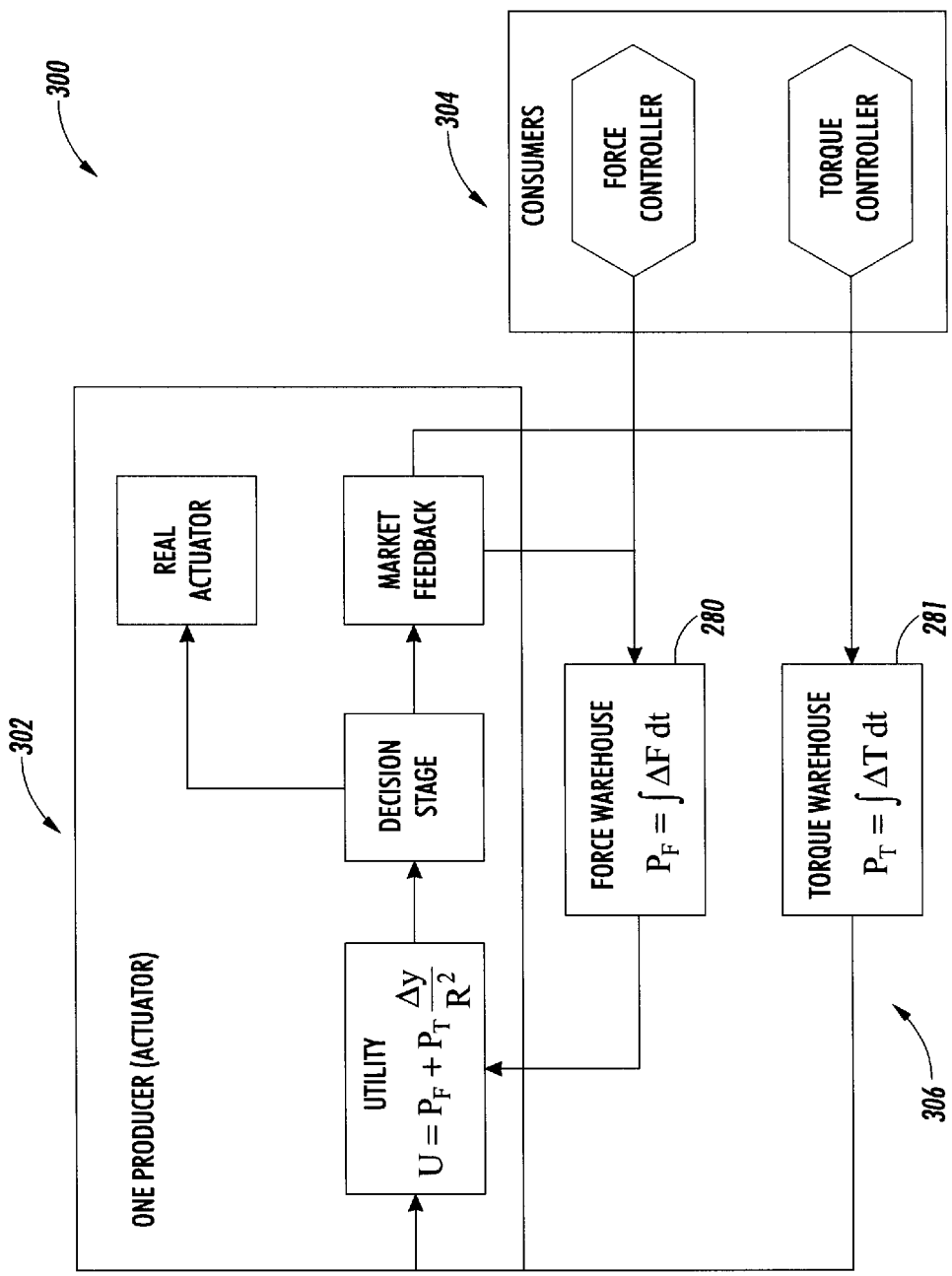
FIG. 18 is a diagram illustrating conflicting resource allocation using two markets in the control of a valve actuator assembly.

FIG. 18 schematically illustrates a suitable air jet loop control system 300. System 300 consists of three main components: the producer block 302, the consumer block 304, and the warehouse (which can alternatively and interchangeably be termed a buffer circuit, or an inventory) block 306. There is one producer block for each actuator, all of which are connected in series to the market wires 280 and 281 for force and torque respectively. There is only one consumer block though, connected to the external paper position controller that determines the desired force for paper movement. If there are multiple controllers simultaneously controlling the paper, there would be multiple consumers and the market would synchronize the actions of the multiple controllers. In general, a single controller will base the desired force on the position of the paper, so there is an additional feedback loop (not illustrated).

Each producer block 302 is the portion of the circuit that interacts with one actuator (valve). The producer block 302 must observe the market prices, evaluate using the utility function, and set the state of the actuator based on them. Additionally it must feed back its state into the force and torque market wires 280 and 281, respectively. The producer block consists of three stages: the utility computation, the decision stage and the feedback to the market. The utility computation stage is the point where each actuator combines the prices from the different markets to obtain a total utility or total price for its product. The utility function any monotonic increasing function of the prices selected to produce desirable behavior of the market. For the air-jet's, the utility beneficially can be a weighted sum of the prices of force and torque. The weighting factor, for example, may be selected to be the perpendicular distance to the center of the paper $\Delta y$ corresponding to the ratio of torque to force that the air-jet produces. The factor $\Delta y$ multiplies the price of torque, so that the air-jets near the center tend to ignore the price of torque, and vice-versa for the air-jets near the edge. Additionally, multiplying by $\Delta y$ sets the correct relative sign between torque and force. A backwards facing air-jet should also multiply the utility by -1, since it produces the exact opposite of a forwards facing air-jet.

For correct scaling between the force and torque terms there must be an additional constant scaling factor. If the force and torque prices are in the same units of value, the scaling factor should be proportional to the inverse of the radius of gyration, named $R^{-2}$. For a rectangular sheet, $R^{-2}=12/(L^2+W^2)$ where L is the length and W is the width. Hence, R is about five inches for an 8.5×11 inch sheet of paper. Summarizing, the first stage of the producer block, will compute a utility $$U = \pm \left( P_F + P_T \frac{\Delta y}{R^2} \right)$$

that characterizes an appropriate tradeoff between the various markets for each producer.

The second stage of the producer block consists of the decision stage in which each actuator must determine, based on its current utility function, whether it should turn on or off. A first constraint that might, beneficially, be taken into account for the air-jets is that there must be a delay time, here at least 3 ms, between changes of state. Not only does the constraint mean that the decision stage must ignore the utility for 3 ms after a transition, but that in general there is a cost to transition between states. Hence the air-jet should not turn on as soon as the utility is positive, or turn off as soon as it is negative, rather it must have some hysteretic threshold. Crossing above the positive threshold or below the negative threshold, once the first 3 ms have passed, should cause the air-jet to change state.

In certain cases there will be actuators with identical utility functions, for example, rows of air-jets at constant $\Delta y$. In this case it is desirable to vary slightly the threshold between actuators so that the market will react more nearly continuously so that large numbers of air-jets are not turned on simultaneously. Such collective behavior can lead to excessive oscillation The thresholds can be set to independently oscillate in time to avoid having one actuator doing all the work. In practice though, many of the air-jets will be waiting for their 3 ms to expire, so most actuators will get a chance to fire, even if they have a high static threshold. The decision stage also controls the actuation of the real actuators. Finally, a third stage of a producer, feeds back the state of the actuator to the market. This is accomplished by applying a force proportional current to the main force market-wire, 280, and a torque proportional current to the torque market-wire, 281. These of these currents are then added by the wire to produce the aggregate supply for force and torque. In a dynamic setting, each producer must have an extra sensor that determines if the paper is located above it. As the paper moves, different sets of actuators will be located under the paper, while the rest produce no force if the jets do not lie under the sheet of paper. The actuators that are not under the paper must remove themselves from the market (i.e. not feedback any current) until after they are under the paper.

In one preferred implementation of the producer circuit, the market-wire can be split into two wires: one wire having the market price as voltage, and another wire with zero voltage that accepts the market feedback as current. While this increases the wire count from two to three within the system (note that any voltage wire requires a ground reference as a implicit or explicitly second required wire), it advantageously allows market feedback with voltage sources connected through a resistor to the feedback wire, instead of current sources (one of which needed to be a bipolar voltage controlled current source). Even more important is the fact that the utility computation stage, which normally requires a voltage multiplier at each site, can be built from a single resistor ladder.

To implement the utility computation stage of the producer block 302, each actuator is connected to a ladder of resistors such that the resistance between any two actuators is proportional to their perpendicular distance $\Delta y$. The resistor ladder can also be substituted with a continuous resistive strip, and each actuator is connected to the nearest part of the strip. All that is required to compute the local utility is to apply voltages at the ends of the strip given by $$U = P_F + P_T \frac{r}{R^2}$$

where r is the distance from the each of the ends of the ladder to the center of the paper (note that in one case r will be negative). This resistive ladder, acting as a voltage divider, substitutes for the utility computation stage at each location and the parts of the market-wire that carry the price information for both force and torque.

Figure 19:
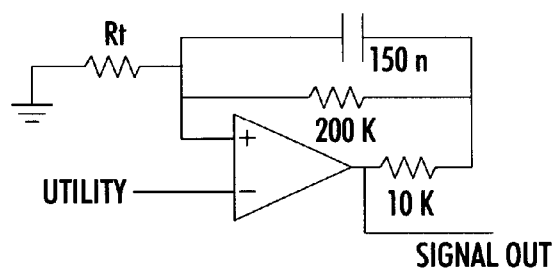
FIG. 19 is a circuit used for valve control.

The utility voltage is directly connected to the decision stage consisting of a voltage comparator with hysteresis. The decision stage can be built out of an op-amp with circuit 320 as seen in FIG. 19. Without the capacitor, this is a standard comparator with hysteresis, with a threshold voltage of approximately:

$$V_T = (13 \text{ V}) \frac{R_T}{210 \text{ K}\Omega}.$$

Choosing RT in the range of 8 K$\Omega$ to 10 K$\Omega$, provides a threshold value near half a volt. However, right after a transition, the capacitor sends this threshold voltage to 12 V preventing further transitions until the capacitor has charged. The value of the capacitor is chosen so that the threshold approaches 2 V after 3 ms, after which time the actuator is allowed to change state. Because the threshold voltage slowly converges to its final value even after the 3 ms, recently flipped actuators are less likely to flip again, preventing one actuator from doing all the work.

The last stage of the producer block 302 is the market feedback, which must output a current to the market-wire when the actuator is turned on. Supplying the current is simple straightforward when the market-wire is split into two, since the feedback component is connected to ground (actually, a virtual ground created by an op-amp). A resistor between the power supply and the market-wire provides the necessary current. The resistor is chosen so that 0.1 mA equals one unit of force, with a sign dependent on the direction of the air-jet. The current can be turned on and off by inserting a FET or analog switch between the resistor and the market-wire.

Minor adjustments must be made in the torque market, since current must be proportional to $\Delta y$. In a system where the paper can move in the transverse direction (or when we generalize this method for 2D), each actuator must be able to calculate $\Delta y$. To supply paper position information, a second resistive ladder can be built with a voltage gradient such that zero corresponds to the center of the paper. Each actuator can use this voltage, with voltage buffer and a suitably chosen resistor to feedback the produced torque into the market.

The demand side of the market in the control loop is particularly simple given the existence of a global controller that can determine the desired force and torque for the paper. The output of the global controller takes on continuous values and is independent of the price (constant demand curve). The consumer block 304 functions by dumping a force proportional current on the force market-wire, and a torque proportional current on the torque market-wire where the scale of the current must be the same as the one used by the actuators. The sign of the consumer current must be opposite to that of the producers so that when supply equals demand the net current on the wire is zero. Accordingly, the consumer block 304 of the market can be constructed exactly as the feedback circuit for the producer block, with a current determined by the controller.

One final component is required to match the discrepancies between the instantaneous values of the consumer and actuation supplied by the actuators: a warehouse 306. Functioning as an "inventory unit", the warehouse 306 is needed to match the discrete supply with a continuous demand. One warehouse (capacitor) per market acts as a deposit for the excess force or torque allowing the time average supply and demand to balance. Alternatively, each agent could have a capacitor in order to smooth its individual supply or demand. For voltage based pricing markets, the typical warehouse component is a capacitor, whose voltage (price) will be the integral of the difference of demand and supply.

The warehouse block consists simply of a capacitor connected between the virtual ground of an op-amp, and the output of the op-amp, forming an integrator. The two prices are fed back into the utility ladder to complete the circuit. Since the capacitor voltage should swing between the positive and negative threshold once for every actuator that is not needed to produce the base force and that has a counterpart in the opposite direction. If the individual thresholds are separated by 1 V, the typical error current is 0.05 mA, and the system has N actuators in each direction, then a reasonable value for the capacitance would be:

$$C = \frac{(.05 \text{ mA})(3 \text{ ms})}{(1 \text{ V})(N/2)} = \frac{300 \text{ nF}}{N}.$$

As will be appreciated, anything having an effective capacitance within the same order of magnitude can also be used, including for example, the distributed capacitance of the market wire itself.

In operation, when demand exceeds supply, the price will begin to rise, and more actuators will turn on, and vice versa. The capacitor will also keep track of the net excess of force so that they it be corrected at a latter time. Note that in this market the price can be both positive and negative. The dual signed price occurs because the market offers both positive and negative force. The consumer does not distinguish between getting an additional unit of forward force, or one less unit of backwards force. A backwards air-jet must behave like a forward air-jet, but based on the negative of the price.

In the simplest case with only one actuator (valve) and one market, the market will work as a sigma-delta converter. The market will pulse width modulate the actuator so that the average supply equals the average demand. A more complicated scenario would have still only a force market but many actuators. As an example of operation of such a force market, assume that half of the actuators can produce one unit of positive force, and the other half can produce one unit of negative force. Of course, they must all have slightly different thresholds, which happens in the real market through their distribution along Δy.

When the one market system is faced with a constant force demand of 2.5 units of force, the price will rapidly rise until the forward actuator with the lowest threshold is turned on, then slightly slower until the second one is turned on. At this point we have the best constant output that can be produced. However, the market can do even better by rapidly pulsating between 2 and 3 actuators. With only 2 actuators turned on, the price will continue to rise until the actuator with the third lowest threshold turns on. After the third actuator turns on, supply will exceed demand and the price will begin to drop. If the price drops rapidly enough, it will turn on an actuator that produces negative force. Once again the force will be 2 units and the price will begin to rise, turning on the forth forward actuator. Later the second backwards actuator will turn on, followed by the fifth forward actuator, and so on. Eventually 3 ms will have passed and actuators will be ready to turn off. When the price turns negative again, instead of turning on another backwards actuator, it will turn off the first forward actuator, followed eventually by the first backwards actuator. The result will be rapid oscillations around the desired force, with a period much smaller than 3 ms.

Eventually there will be cases when actuators turn on or off at the same time. Primarily this occurs when the magnitude of the price grows large triggering an actuator with large threshold, and in the meantime an actuator with low threshold ends its 3 ms waiting period and also flips. This problem can be corrected by forbidding actuator flips when the slope of the utility function is negative. However, the larger the error in force is, the faster the price changes, so states with excessive error are rapidly corrected.

The analysis of a system with both force and torque markets, is somewhat more complicated but the results are similar. The only caveat is that, given the choice of utility function, the first actuators to turn on to correct the torque market are those that provide the highest torque. This is necessary to ensure the stability of the markets, but has the effect that the torque oscillations will be greater than in other systems.

Figure 20:
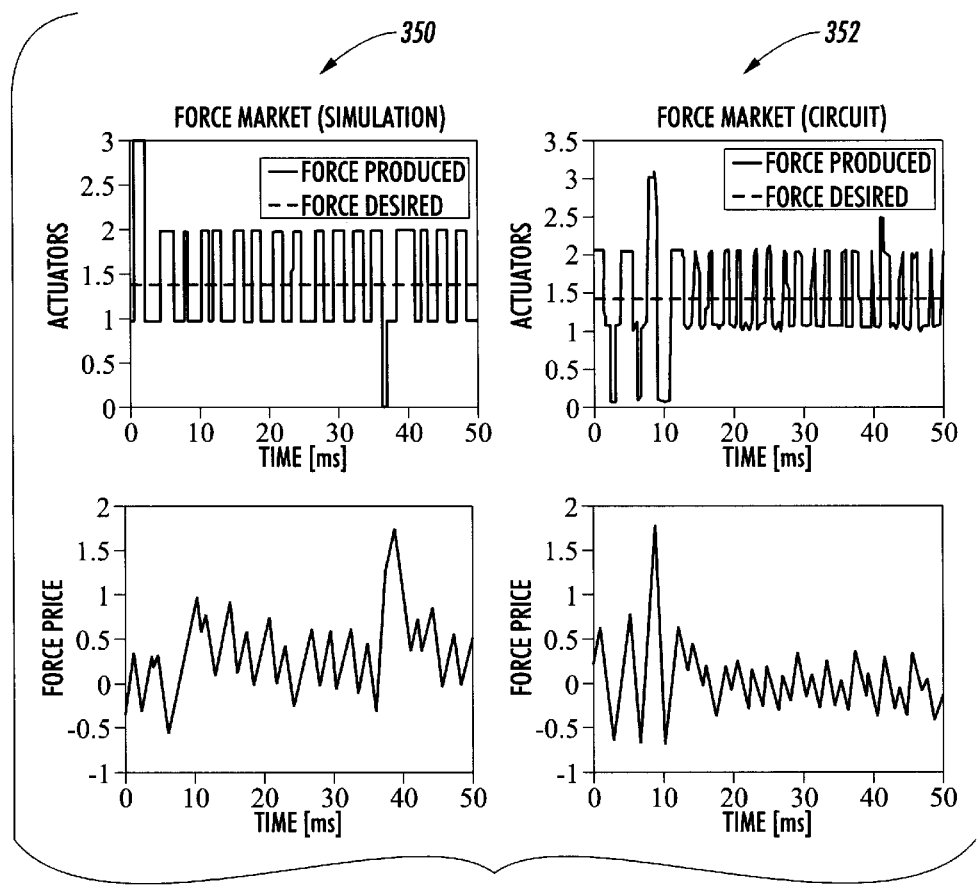
FIG. 20 is a comparison of output of real and simulated of combined markets of force and torque (only force is shown in this figure) for the control of air valve assemblies having three actuators oriented in each direction.

A sample system was built with 3 actuators in each direction. The output of the physical system 352 is compared against an equivalent simulation 350 in FIG. 20. The physical system was built with a slightly faster (as compared to the simulation 350) time constant of about 2 ms, which explains the difference in oscillation speed. The physical system also presented different stable oscillations for the same input, possibly because of the small number of actuators present and the high symmetry with which they were placed (centered around y=0, with equal spacing between them).

Systems built in accordance with the foregoing instructions are known to be overall stable in the sense that the price, which is the integral of the error in force, will always be finite even as time goes to infinity. For one market this is a trivial statement, since no later than 3 ms after crossing the last highest threshold, every actuator will have changed state to reduce the price. Even if the market overshoots in the other direction, the same condition will apply: the price cannot increase 3 ms after having crossed the highest threshold. Since the total force is bounded, the maximum price, and hence the maximum error integrated over all time, is bounded by approximately 3 times the number of actuators.

With two markets, when the prices of force and torque are high enough, the center actuators will tend to respond to the force market, while the edge actuators will only respond to the torque market. Each group of actuators cause its market to tend towards time averaged equilibrium, in the same way described above with a bounded integral of the error.

Another stability criterion that can be asked is whether the market can get trapped in a state of oscillation where all the actuators are on at the same time, and then all off at the same time. In this undesirable case, the system is only stable because there are a finite number of. This state can occur in highly symmetrical systems, where actuators have the same thresholds and the maximum positive torque is equal to the maximum negative torque. In most systems though, a rail to rail oscillation will decay to smaller oscillations near the average. The mechanism for this desirable decay that in a non-symmetrical system, there is a torque imbalance that will eventually break the symmetry between actuators, preventing them all from turning on at the same time. While one cannot prove that all systems are unconditionally stable from a theoretical standpoint, simulation has shown that this decay generally happens for a wide range of systems.

Implementations according to the present invention also exhibit good scalability properties. From a theoretical standpoint, as the number of actuators grows, the system oscillates faster, and the RMS of the integral of the error decreases. Hence, as the number of actuators increases, the system can only perform better. From a practical standpoint there are certain issues that must be considered carefully. For example, as the number of actuators increases either the current per actuator decreases, or the total average current in the market wire must increase. The high current will require special hardware and consume a lot of power, whereas the low current per actuator could result in the signals from individual actuators being lost in the noise. One way to avoid these problems is to have sub-markets, with a reduced number of actuators in each, that will produce a fraction of the goal force. The sub-markets can allocate the force between themselves though another greater market. However, for systems of up to a few thousand actuators, a single market should be sufficient to coordinate all the actuators.

Robustness is the greatest advantage achieved by building the system as a decentralized market model. Because there is no central controller that must be aware of the positions of each actuator, a single actuator can remove itself from the market, without affecting the force allocation. Robustness is also important because as the paper moves, actuators will slowly enter and exit the market. Thus it is important that the system be able to handle these changes gracefully.

So far we have only considered a system with 2 degrees of freedom: torque and force. However, many times it is desirable to move the paper along the y axis as well. This motion in 2D corresponds to 3 degrees of freedom, and hence 3 independent markets: force along x, force along y, and torque. In a full 2D system, air-jets that push along x will operate as before computing their utility from the prices of force in x, and torque. Similarly air-jets that push along y will observe the price of force in y, and the torque. In fact, an actuator that points along an angle $\theta$, can take its force price to be $P=P_{xForce}*\sin(\theta)+P_{yForce}*\cos(\theta)$ (which is a simple calculation that can be done with suitably chosen resistors for each actuator), and then proceed as normal.

The physical implementation of the 2D system requires 3 wires for current feedback into each of the markets. Additionally, there must be two resistive strips, one along x and one along y, that will compute the utility function. Finally, there must be another two strips that will compute $\Delta x$ and $\Delta y$ so that the actuators can produce the correct torque feedback. The stability of the system can be guaranteed in the same way as with the two market loop. When the prices become too high, the system uncouples into actuators fixing the x force, actuators fixing the y force, and actuators fixing the torque. Otherwise the system should work as desired.

As those skilled in the art will appreciate, the error in position can still diverge. For example, let the desired force be 0.5 units of force, and let the produced force switch between 0 and 1 units of force with a period T.

Then $$\Delta V(t) \equiv \int \Delta F(t) dt / M\ T/8$$

$$\Delta X(t) \equiv \int \Delta V(t) dt\ T/8\cdot_t$$

where $\Delta F$ is the error in force, $\Delta X(t)$ is the error in position of the paper and could be unbounded with time, and $\Delta V(t)$ and M is the mass of the paper While the position error diverges as time goes to infinity, the error can be reduced by decreasing the period, thus our emphasis on rapid oscillations. However, to eliminate the possibility of divergence completely, the market must compensate for the cumulative error in position. This is accomplished by adding a double integral term to the price:

$$P = \int \Delta F\ dt + C \int \int \Delta F\ dt\ dt$$

where C is some suitably chosen constant.

In practice though, for a system with enough actuators, this error in position is generally small relative to the physical errors that affect the paper such as differences in air-jets, unwanted air-currents, and so on. The position error produced by the market can usually be fixed by the paper controller, along with all the other errors.

As those skilled in the art will appreciate, other various modifications, extensions, and changes to the foregoing disclosed embodiments of the present invention are contemplated to be within the scope and spirit of the invention as defined in the following claims.

What is claimed is:

1. A market based control system comprising
   multiple producing units and multiple consuming units, and
   an information channel connecting multiple producing units to multiple consuming units wherein each of the multiple producing units and multiple consuming units impart a non-electrical partitionable physical property onto said information channel, the information channel transmitting and receiving market price information encoded as measurable changes in the non-electrical partitionable physical properties.

2. The market based control system of claim 1, further comprising a fluid conduit connecting multiple producing units and multiple consuming units, with measurable changes in fluid pressure in the fluid conduit forming the information channel.

3. The market based control system of claim 1, further comprising a fluid conduit connecting multiple producing units and multiple consuming units, with measurable changes in chemical concentration of selected chemical species in the fluid conduit forming the information channel.

4. The market based control system of claim 1, further comprising a thermal conduit connecting multiple producing units and multiple consuming units, with measurable changes in temperature of the thermal conduit forming the information channel.

5. The market based control system of claim 1, wherein market price information encoded as measurable changes in non-electrical partitionable physical properties are measured by digital circuitry.

6. The market based control system of claim 1, wherein market price information encoded as measurable changes in non-electrical partitionable physical properties are measured by analog circuitry.

7. An actuator control system comprising
   multiple actuators having determinable actuation levels, and
   an information channel connecting the multiple actuators wherein each of the multiple actuators impart a non-electrical physical property onto said information channel, the information channel transmitting and receiving market price information encoded as measurable changes in the non-electrical partitionable physical properties, with determinable actuation levels of the multiple actuators set in response to market price information.

8. The market based control system of claim 7, wherein the information channel further comprises a fluid conduit connecting multiple actuators, with measurable changes in fluid pressure in the fluid conduit forming the information channel.

9. The market based control system of claim 7, wherein the information channel further comprises a fluid conduit connecting multiple actuators, with measurable changes in chemical concentration of selected chemical species in the fluid conduit forming the information channel.

10. The market based control system of claim 7, wherein the information channel further comprises a thermal conduit connecting multiple actuators, with measurable changes in temperature in the thermal conduit forming the information channel.

11. The market based control system of claim 7, wherein market price information encoded as measurable changes in non-electrical partitionable physical properties are measured by digital circuitry.

12. The market based control system of claim 7, wherein market price information encoded as measurable changes in non-electrical partitionable physical properties are measured by analog circuitry.

13. A market based control system comprising:
multiple producing units and multiple consuming units interconnected by a closeable fluid conduit, and
an information channel connecting multiple producing units to multiple consuming units wherein each of the multiple producing units and multiple consuming units impart a pressure in the closeable fluid conduit, the information channel transmitting and receiving market price information encoded as measurable changes in fluid pressure in the closeable fluid conduit.

14. The market based control system of claim 13, wherein market price information encoded as measurable changes in fluid pressure are measured by digital circuitry.

15. The market based control system of claim 13, wherein market price information encoded as measurable changes in fluid pressure are measured by analog circuitry.

* * * * *